(12) United States Patent
Rosales et al.

(10) Patent No.: US 12,488,573 B2
(45) Date of Patent: Dec. 2, 2025

(54) APPARATUS, SYSTEM, AND METHOD OF GENERATING A MULTI-MODEL MACHINE LEARNING (ML) ARCHITECTURE

(71) Applicant: Intel Corporation, Santa Clara, CA (US)

(72) Inventors: Rafael Rosales, Unterhaching (DE); Pablo Munoz, Folsom, CA (US); Neslihan Kose Cihangir, Munich (DE); Michael Paulitsch, Ottobrunn (DE)

(73) Assignee: INTEL CORPORATION, Santa Clara, CA (US)

( * ) Notice: Subject to any disclaimer, the term of this patent is extended or adjusted under 35 U.S.C. 154(b) by 732 days.

(21) Appl. No.: 17/710,770

(22) Filed: Mar. 31, 2022

(65) Prior Publication Data

US 2022/0222927 A1 Jul. 14, 2022

(51) Int. Cl.
*G06V 10/776* (2022.01)
*G06V 10/764* (2022.01)

(52) U.S. Cl.
CPC .......... *G06V 10/776* (2022.01); *G06V 10/764* (2022.01)

(58) Field of Classification Search
CPC .......................... G06V 10/776; G06V 10/764
See application file for complete search history.

(56) References Cited

U.S. PATENT DOCUMENTS

| | | | | |
|---|---|---|---|---|
| 11,003,992 B2* | 5/2021 | Wesolowski | ........... | G06N 3/084 |
| 11,009,836 B2* | 5/2021 | Hoffmann | .......... | G05B 13/0265 |
| 11,256,975 B2* | 2/2022 | Dalli | ...................... | G06N 5/045 |
| 11,263,744 B2* | 3/2022 | Yoo | ........................ | G06T 7/0012 |
| 11,524,846 B2* | 12/2022 | Cesic | .................. | B65G 1/1375 |
| 11,860,613 B2* | 1/2024 | Maury | .................. | G06F 16/906 |
| 11,928,572 B2* | 3/2024 | Sawaf | ..................... | G06N 5/043 |
| 12,106,097 B2* | 10/2024 | Rieber | ................. | G06F 9/3001 |

(Continued)

FOREIGN PATENT DOCUMENTS

WO   2020123109   6/2020

OTHER PUBLICATIONS

Koopman, Philip, Aaron Kane, and Jen Black. "Credible autonomy safety argumentation." 27th Safety-Critical Sys. Symp. Safety-Critical Systems Club, Bristol, UK. 2019, 27 pages.

(Continued)

*Primary Examiner* — Gregory M Desire
(74) *Attorney, Agent, or Firm* — Shichrur & Co.

(57) ABSTRACT

For example, an apparatus may include an input to receive Machine Learning (ML) model information corresponding to an ML model to process input information; and a processor to construct a multi-model ML architecture including a plurality of ML model variants based on the ML model, wherein the processor is configured to determine the plurality of ML model variants based on an attribution-based diversity metric corresponding to a model group including a first ML model variant and a second ML model variant, wherein the attribution-based diversity metric corresponding to the model group is based on a diversity between a first attribution scheme and a second attribution scheme, the first attribution scheme representing first portions of the input information attributing to an output of the first ML model variant, the second attribution scheme representing second portions of the input information attributing to an output of the second ML model variant.

24 Claims, 16 Drawing Sheets

(56) References Cited

U.S. PATENT DOCUMENTS

| | | | | |
|---|---|---|---|---|
| 12,367,407 | B2* | 7/2025 | Dalli | G06N 5/048 |
| 2021/0312276 | A1 | 10/2021 | Rawat et al. | |
| 2021/0334700 | A1 | 10/2021 | Nagaraja | |
| 2023/0089140 | A1* | 3/2023 | Selim | G16B 40/20 702/19 |

OTHER PUBLICATIONS

Chen, Liming, and Algirdas Avizienis. "N-version programming: A fault-tolerance approach to reliability of software operation." Proc. IEEE Int. Symp. on Fault-Tolerant Computing vol. 1. 1978, 7 pages.

Littlewood, Bev, and Lorenzo Strigini. "A discussion of practices for enhancing diversity in software designs." 2000, 59 pages.

Breiman, Leo. "Bagging predictors." Machine learning 24.2 (1996): pp. 123-140.

Kuncheva, Ludmila I., et al. "Measures of diversity in classifier ensembles and their relationship with the ensemble accuracy." Machine learning 51.2 (2003): pp. 181-207.

Partridge, Derek, and Wojtek Krzanowski. "Distinct failure diversity in multiversion software." Res. Rep 348, Aug. 8, 1997: pp. 1-31.

Löfström, Tuwe. On effectively creating ensembles of classifiers: Studies on creation strategies, diversity and predicting with confidence. Diss. Department of Computer and Systems Sciences, Stockholm University, 2015, 110 pages.

Forin, Philippe. "Vital coded microprocessor principles and application for various transit systems." IFAC Proceedings vols. 23.2 (1990): pp. 79-84.

https://www.silistra-systems.com/documents/pubs/2021-04-21-safetect_Interoperability-Diversified-Encoding_Martin-Suesskraut-Eng.pdf, 28 pages.

Loquercio, Antonio, Mattia Segu, and Davide Scaramuzza. "A general framework for uncertainty estimation in deep learning." IEEE Robotics and Automation Letters, vol. 5, No. 2, Apr. 2020, pp. 3153-3160.

Fort, Stanislav, Huiyi Hu, and Balaji Lakshminarayanan. "Deep ensembles: A loss landscape perspective." arXiv preprint arXiv:1912.02757 (2019), 15 pages.

https://www.omg.org/spec/IDL/, Interface Definition Language, Version 4.2, OMG Document No. formal/18-01-05 Release Date: Mar. 2018, Standard Document URL: http://www.omg.org/spec/IDL/4.2/, 142 pages.

David Baehrens, Timon Schroeter, Stefan Harmeling, Motoaki Kawanabe, Katja Hansen, and Klaus-Robert Müller. How to explain individual classification decisions. Journal of Machine Learning Research, 11(Jun): pp. 1803-1831, 2010.

Mukund Sundararajan, Ankur Taly, and Qiqi Yan. Axiomatic attribution for deep networks. arXiv preprint arXiv:1703.01365, 2017, 10 pages.

Selvaraju, Ramprasaath R., et al. "Grad-cam: Visual explanations from deep networks via gradient-based localization." Proc. of the IEEE international conference on computer vision. 2017, pp. 618-626.

Ribeiro, Marco Tulio, Singh, Sameer, and Guestrin, Carlos. "why should I trust you?": Explaining the predictions of any classifier. In Knowledge Discovery and Data Mining (KDD), 2016, pp. 1135-1144.

Cai, Han, et al. "Once-for-all: Train one network and specialize it for efficient deployment." arXiv preprint arXiv:1908.09791.2019, pp. 1-15.

Munoz, Pablo et al. "Enabling NAS with Automated Super-Network Generation". In Practical Deep Learning in the Wild at AAAI-22. 2022, 4 pages.

Rui P. Cardoso et al., "Using Novelty Search to Explicitly Create Diversity in Ensembles of Classifiers", Jul. 2021, 9 pages.

* cited by examiner

APPARATUS, SYSTEM, AND METHOD OF GENERATING A MULTI-MODEL MACHINE LEARNING (ML) ARCHITECTURE

TECHNICAL FIELD

Aspects described herein generally relate to generating a multi-model Machine Learning (ML) architecture.

BACKGROUND

Autonomous systems such as, for example, industrial robots, or autonomous vehicles, may be increasingly dependent on Machine Learning (ML), for example, to execute one or more tasks. For example, an autonomous system may execute an ML model to manage one or more visual perception tasks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
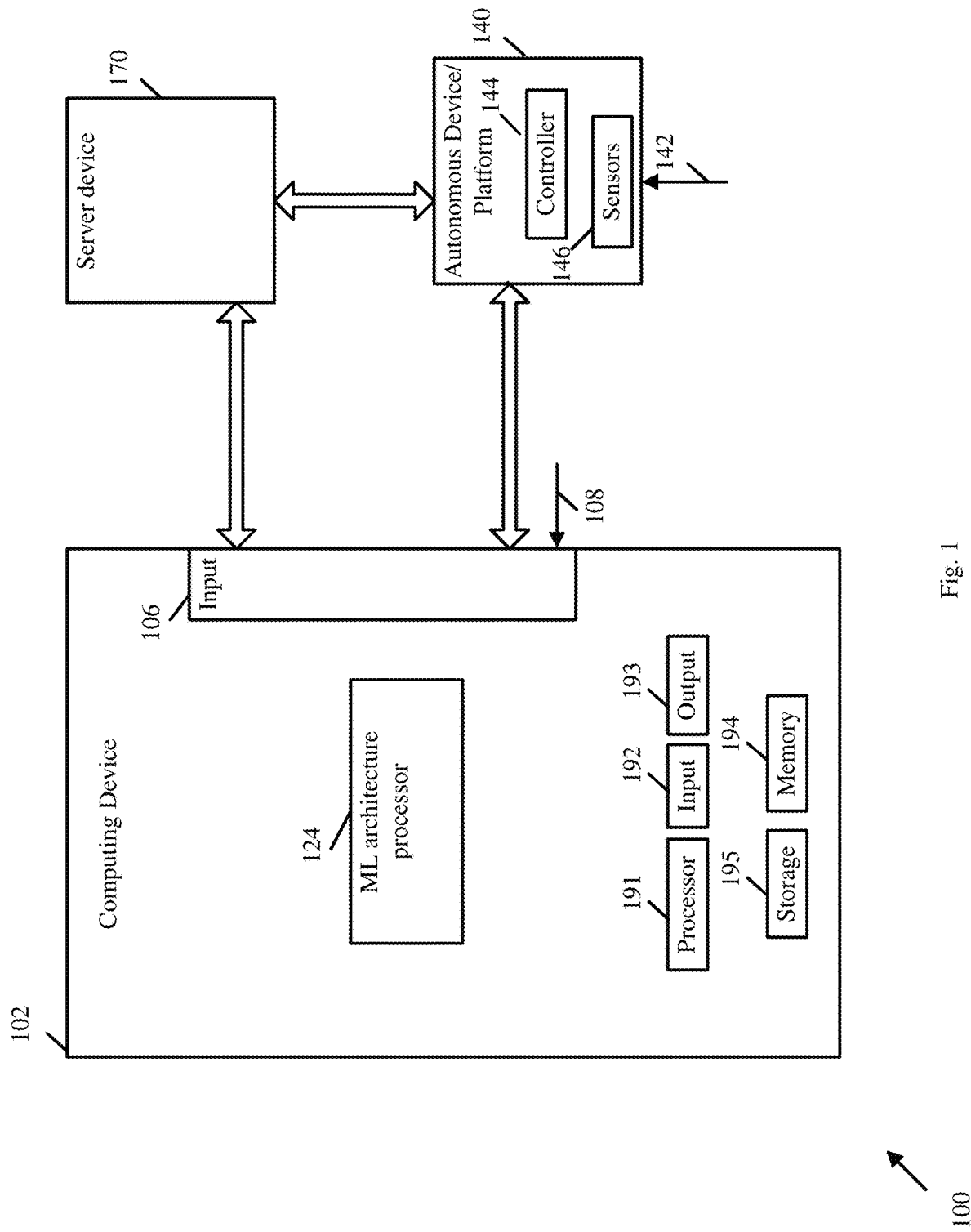
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

Some aspects may be used in conjunction with various devices and systems, for example, an autonomous device, an autonomous platform, an autonomous system, an autonomous robot, a robotic device, a robotic system, an autonomous vehicle, a server device, a cloud server, an industrial device, an industrial system, an industrial platform, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., controller circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Reference is made to FIG. 1, which schematically illustrates a system 100, in accordance with some demonstrative aspects.

In some demonstrative aspects, system 100 may include an autonomous device 140 (also referred to as an "edge device"), which may be configured to perform one or more tasks, e.g., as described below.

In some demonstrative aspects, the autonomous device 140 may include an industrial robot configured to perform one or more industrial tasks and/or manufacturing tasks.

In some demonstrative aspects, autonomous device 140 may be implemented, for example, in a factory for handling one or more objects.

In one example, autonomous device 140 may be implemented for handling a part that should be affixed to a product that is being manufactured.

In another example, autonomous device 140 may be implemented for handling objects to be classified in a manufacturing line, or any other objects.

In some demonstrative aspects, the autonomous device 140 may include a vehicular robot configured to perform one or more vehicular and/or driver tasks, e.g., controlling of one or more vehicle/driver assisted systems.

In other aspects, the autonomous device 140 may include any other autonomous system, which may be implemented as part of any other system and/or platform.

In some demonstrative aspects, autonomous device 140 may include a controller 144 configured to control one or more functionalities and/or tasks to be performed by the autonomous device 140, e.g., as described below.

In some demonstrative aspects, autonomous device 140 may include one or more sensors 146 configured to provide sensing information to the controller 144, for example, to control one or more tasks performed by autonomous device 140.

In some demonstrative aspects, sensors 146 may include image sensors, e.g., a camera, movement sensors, acceleration sensors, acoustic sensors, e.g., microphones, and/or any other sensors.

In some demonstrative aspects, autonomous device 140 may include one or more robot arms, and/or one or more robotic elements and/or components.

In some demonstrative aspects, a robot arm may include a plurality of movable members, which may be movable by actuation of associated motors. For example, the robot arm may allow physical interaction with an environment to carry out a task, e.g., handling one or more objects.

In some demonstrative aspects, the robot arm may include a plurality of joint elements, which may connect, for example, the movable members with each other. For example, a joint element may have one or more joints, each of which may provide rotatable motion, e.g., rotational motion, and/or translatory motion, e.g., displacement, to associated members and/or motion of members relative to each other. For example, the movement of the movable members may be initiated by suitable actuators.

In some demonstrative aspects, an actuator may include a component adapted to affect a mechanism or process in response to being driven. The actuator may respond to commands given by controller 144, for example, by performing mechanical movement. For example, an actuator, typically a motor (or electromechanical converter), may be configured to convert electrical energy into mechanical energy when it is activated (i.e. actuated).

In some demonstrative aspects, the controller 144 may be configured to implement interaction with the environment, e.g., by controlling the one or more actuators, according to a control program, for example, in order to control the one or more robot arms, for example, according to a task to be performed.

In some demonstrative aspects, controller 144 may implement Machine Learning (ML) functionalities to control, perform and/or execute one or more tasks.

In some demonstrative aspects, one or more operations, functionalities and/or tasks of the autonomous device 140 may be managed and/or performed, for example, based on an ML model.

In one example, visual perception of the autonomous device 140 may be managed by the ML model, for example, based on image sensing information from image sensors 146.

In another example, any other additional or alternative task of the autonomous device 140 may be managed by the ML model.

In some demonstrative aspects, autonomous device 140 may be configured to receive input information 142 corresponding to the task.

In some demonstrative aspects, the input information 142 may be processed according to the ML model, for example, to determine an output of the ML model.

In some demonstrative aspects, the output may be used, for example, to perform one or more operations by the autonomous device 140.

In some demonstrative aspects, the input information 142 may include sensing information from one or more of the sensors 146.

In one example, autonomous device 140 may be configured to perform a task of classification of elements in a manufacturing line. According to this example, the input information 142 may include an image of the elements, and the output may include classification and/or identification information corresponding to the elements.

In another example, autonomous device 140 may be configured to perform a safety task, for example, recognition of safety-related information in an environment of the autonomous device 140. In one example, the safety task may include monitoring the environment to recognize human movement, e.g., a hand movement, for example, in order to stop an operation of an industrial machine, e.g., when the movement is recognized. According to this example, the input information 142 may include an image of the an environment of the autonomous device, and the output may provide an indication of the detected movement.

In some demonstrative aspects, an autonomous device may be subject to one or more failures, which may be caused by or related to one or more ML-model failures, e.g., as described below.

In some demonstrative aspects, the ML-model failures may be attributed, for example, to one or more causes, e.g., as described below.

In one example, the ML-model failures may be attributed, for example, to one or more systematic errors, which may occur during creation of the ML-model, e.g., due to low-quality training data, inadequate model architecture complexity, a sub-optimal training approach, and/or the like.

In another example, the ML-model failures may be attributed, for example, to quality degradation, which may be caused by model compression, e.g., quantization, pruning, and/or the like.

In another example, the ML-model failures may be attributed, for example, to tooling bugs, e.g., at one or more design stages, platform faults, and/or deployment assumption violations, e.g., Out Of Distribution (ODD) execution.

In some demonstrative aspects, an autonomous device may use one or more computing resources, for example, to execute the ML model.

In some demonstrative aspects, the computing resources at the autonomous device may be limited. This situation may pose a challenge to achieving a sound assurance case.

In one example, there may be a need to highly optimize an autonomous system, for example, while slightly degrading an algorithmic performance and making use of dedicated accelerators, for example, to meet Artificial Intelligence (AI) compute demand. According to this example, the computing resources remaining available for safety assurance may be scarce.

In another example, the growth in compute requirements of AI may be observed to be super-exponential, for example, even without taking into account an overhead associated with dependability enhancing mechanisms, which may double, triple, or X-multiply the need for the computing resources.

Figure 2:
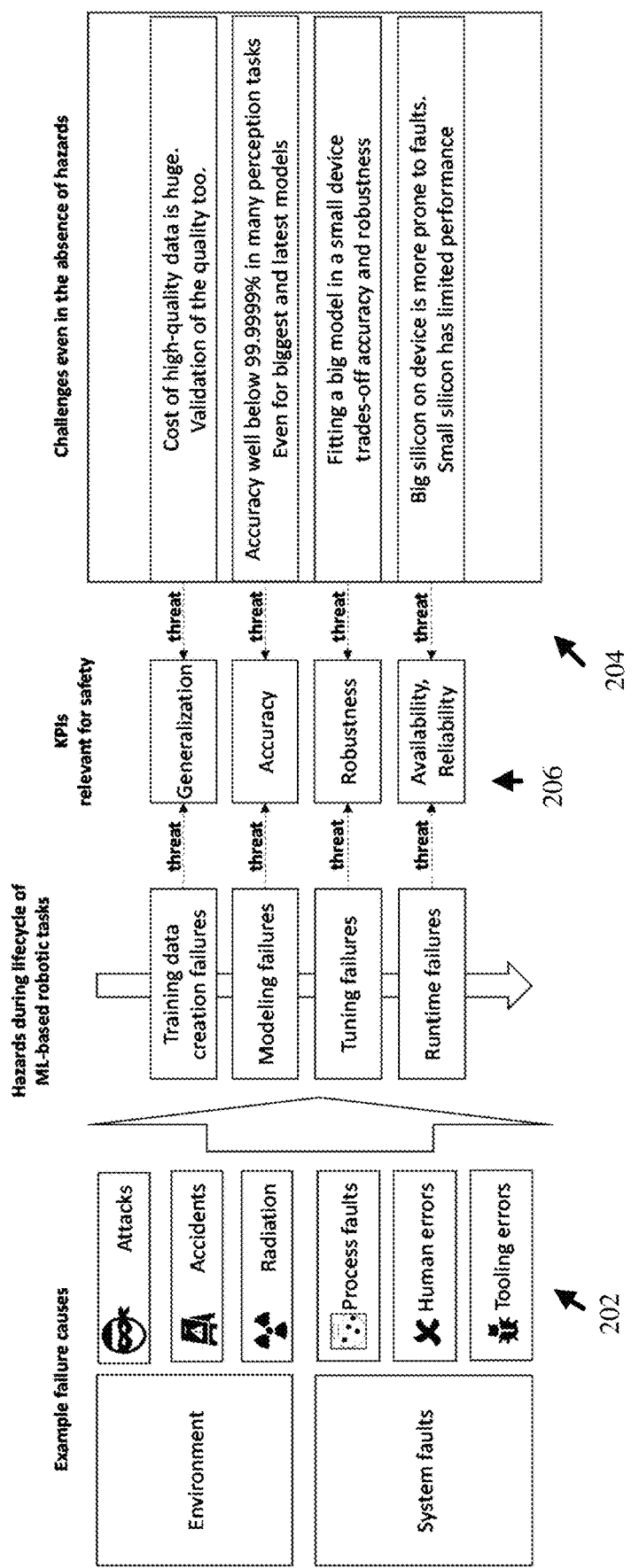
FIG. 2 is a schematic illustration of a hazards and challenges scheme to demonstrate hazards and challenges of a Machine Learning (ML) model, which may be addressed in accordance with some demonstrative aspects.

Reference is made to FIG. 2, which schematically illustrates a hazards and challenges scheme 200 to demonstrate hazards and challenges of an ML-model, which may be addressed in accordance with some demonstrative aspects.

As shown in FIG. 2, one or more hazards 202 and/or challenges 204 may degrade one or more Key Performance Indicators (KPIs) 206 of an ML model.

In one example, KPIs 206, for example, accuracy and/or robustness, may have a significant impact on an overall system safety. However, resource limitations and/or challenges 204 may pose significant constraints to achieve suitable KPI scores, for example, even under an assumption of no hazards. For example, this may be due to Hardware (HW) faults and/or adversary attacks. For example, hazards 202 may be real and/or may appear at some or all stages of an autonomous device life cycle.

ML architecture processor 124ML architecture processor 124ML architecture processor 124ML architecture processor 124ML architecture processor 124ML architecture processor 124ML architecture processor 124ML architecture processor 124ML architecture processor 124ML architecture processor 124ML architecture processor 124ML architecture processor 124ML architecture processor 124ML architecture processor 124ML architecture processor 124 Referring back to FIG. 1, in some demonstrative aspects, system 100 may include a computing device 102, which may be configured to construct a multi-model ML architecture (also referred to as a "safety architecture"), for example, to be utilized by the autonomous device 140, e.g., as described below.

In some demonstrative aspects, the multi-model ML architecture, may be configured to control manage, and/or perform one or more tasks of the autonomous device 140, for example, based on the input information 142.

In some demonstrative aspects, the multi-model ML architecture may be configured to be executed, implemented, and/or performed on one or more devices, systems and/or platforms, e.g., as described below.

In some demonstrative aspects, the multi-model ML architecture may be configured to be executed, implemented, and/or performed on autonomous device 140 and/or on computing device 102, e.g., as described below.

In some demonstrative aspects, the multi-model ML architecture may be configured to be executed, implemented, and/or performed on autonomous device 140 and/or on a server device 170 (also referred to as an "edge server").

In some demonstrative aspects, one or more first portions of the multi-model ML architecture may be executed, implemented, and/or performed on autonomous device 140, and/or one or more second portions of the multi-model ML architecture may be executed, implemented, and/or performed on server device 170, e.g., as described below.

In some demonstrative aspects, server 170 may include, for example, a server device, an edge server, a cloud server, an application server, a web server, a proxy server, and/or any other server.

In some demonstrative aspects, computing device 102 may be implemented as a stand-alone device, which may be separate from server 170 and autonomous robot device 140, e.g., as describe below.

In some demonstrative aspects, computing device 102 may be implemented, for example, as part of a server device, for example, as part of server 170.

In other aspects, computing device 102 may be implemented, for example, as part of any other element and/or device of system 100.

In some demonstrative aspects, computing device 102 may include, for example, a server device, an edge server, a cloud server, an application server, a web server, a proxy server, a desktop computer, a mobile computer, a server computer, or the like.

In some demonstrative aspects, computing device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of one or more of device 102 may be enclosed in a common housing or packaging, and may be interconnected or operably associated using one or more wired or wireless links. In other aspects, components of one or more of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device.

Output unit 193 may include, for example, a display, a screen, a touch-screen, one or more audio speakers or earphones, and/or other suitable output devices.

In some demonstrative aspects, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a disk drive, a solid-state drive (SSD), and/or other suitable removable or non-removable storage units. Memory unit 194, for example, may store data processed by device 102.

In some demonstrative aspects, device 102 may include a ML architecture processor 124. ML architecture processor 124 may be configured to perform and/or to trigger, cause, instruct and/or control device 102 to perform, one or more communications, to generate and/or communicate one or more messages and/or transmissions, and/or to perform one or more functionalities, operations and/or procedures at 102 and/or between devices 102, 140, 170 and/or one or more other devices e.g., as described below.

In some demonstrative aspects, ML architecture processor 124 may include, or may be implemented, partially or entirely, by circuitry and/or logic, e.g., one or more processors including circuitry and/or logic, memory circuitry and/or logic, and/or any other circuitry and/or logic, configured to perform the functionality of ML architecture processor 124. Additionally or alternatively, one or more functionalities of ML architecture processor 124 may be implemented by logic, which may be executed by a machine and/or one or more processors, e.g., as described below.

In one example, ML architecture processor 124 may include circuitry and/or logic, for example, one or more processors including circuitry and/or logic, to cause, trigger and/or control computing device 102, to perform one or more operations, communications and/or functionalities, e.g., as described herein. In one example, ML architecture processor 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, ML architecture processor 124 may be configured to construct a multi-model ML architecture, which may be implemented to provide a technical solution to enhance algorithmic performance of ML models, e.g., as described below.

For example, one or more techniques to enhance algorithmic performance of ML models may be utilized, for example, to mitigate the hazards and/or challenges of an ML-model, e.g., hazards 202 and/or challenges 204.

In some demonstrative aspects, for example, in some use cases, scenarios, and/or implementations, there may be a need to address one or more technical issues of techniques, which enhance the algorithmic performance of ML models by increasing a ML model complexity. For example, by addressing training challenges of big models, higher accuracies may be achieved, e.g., residual connections, batch normalization, and/or the like.

In one example, the increased complexity may not cope with super-exponential growth of AI computation, e.g., according to Moore's law. For example, current workloads may be optimized to fit device resources, which may leave little room for dependability-enhancing mechanisms.

In another example, a scalability required for future workloads of autonomous systems, e.g., robots in open environments, advanced human physical interactions, and/or the like, may require edge/cloud compute and/or memory resources.

In some demonstrative aspects, ML architecture processor 124 may be configured to construct a multi-model ML architecture, which may be implemented to provide a technical solution using an edge server, e.g., server 170, for example, for safety-critical ML-based workloads, and/or to increase the resources available for safety tasks on the autonomous device 104, e.g., as described below.

In some demonstrative aspects, ML architecture processor 124 may be configured to construct the multi-model ML architecture, for example, based on a plurality of ML models, which may be generated, for example, according to a Neural Architecture Search (NAS) mechanism and/or any other mechanism. For example, the NAS mechanism may be implemented to enable automatic exploration of hyperparameters of deep learning models, for example, to identify models having high performance and/or reduced cost.

In one example, a design space of ML models may be enormous, which may make using the NAS a big challenge, for example, during training.

In some demonstrative aspects, ML architecture processor 124 may be configured to construct the multi-model ML architecture, for example, based on an efficient super-network-based NAS technique, which may allow to extract thousands of ML models, for example, even without re-training each of the models, e.g., as described below.

In some demonstrative aspects, for example, in some use cases, scenarios, and/or implementations, there may be a need to address one or more technical issues of techniques implementing ensembles of ML models, e.g., ML model groups, in which a final score of the ensemble may be derived from individual opinions of each member, e.g., an ML model, of the ensemble, for example, to improve a total accuracy or output confidence/uncertainty.

In one example, some ensemble-based techniques to derive diverse ensemble members may be based on metrics that examine an output or a feature space of each member. These techniques may result in a necessary trade-off between accuracy and diversity.

In some demonstrative aspects, for example, in some use cases, scenarios, and/or implementations, there may be a need to address one or more technical issues of techniques implementing diversity metrics, which may be measured at an output of each member, e.g., each ML model. For example, these techniques may compare ML models, for example, when outputs of the ML models "disagree". As a result, these techniques may suffer degraded accuracy.

In some demonstrative aspects, ML architecture processor 124 may be configured to construct the multi-model ML architecture, for example, while using an attribute/evidence-based diversity metric, e.g., as described below.

In some demonstrative aspects, attribute/evidence-based diversity metric may be utilized to provide a technical solution, which may not have a trade-off between accuracy and diversity, for example, in the creation of ensemble members, e.g., as described below.

In some demonstrative aspects, for example, in some use cases, scenarios, and/or implementations, there may be a need to address one or more technical issues of techniques implementing stochastic models. For example, some stochastic models may learn distributions instead of scalar values, and may capture uncertainty during training, for example, to better estimate epistemic uncertainty during inference through sampling.

In one example, some techniques implementing stochastic models may achieve diversity, which may be shown to stay within a local mode, e.g., compared to ensembles, which may not stay in local mode. Accordingly, the ensembles may be a better candidate for implementing diverse channels.

In some demonstrative aspects, ML architecture processor 124 may be configured to construct the multi-model ML architecture, according to a technical solution, which may support the use of stochastic models as ensemble members, for example, not as an alternative to ensembles, e.g., as described below.

In some demonstrative aspects, for example, in some use cases, scenarios, and/or implementations, there may be a need to address one or more technical issues of techniques implementing multi-modality to improve an output of the ML model. For example, some multi-modality techniques may use different sensory data, e.g., text, voice, images, radar, and/or the like, to provide more information, e.g., complementary and/or redundant information, to improve the output of the ML model.

In one example, there may be a need to address one or more technical issues when implementing multi-modality techniques. For example, some multi-modality techniques may have an extra cost and/or a challenge to discern which sensory data is correct, for example, when there are disagreements within the sensory data. For example, the disagreements may be due to the highly complementary nature of information quality of the sensory data, e.g., color in 2D versus point distances.

In some demonstrative aspects, ML architecture processor 124 may be configured to construct the multi-model ML architecture, according to a technical solution, which may be based on a single modality. Accordingly, the multi-model ML architecture may provide a technical solution which may not require diverse inputs, and/or may be applied to each modality, for example, based on an orthogonal/complementary approach, e.g., as described below.

In some demonstrative aspects, for example, in some use cases, scenarios, and/or implementations, there may be a need to address one or more technical issues of techniques implementing diversity of training data, for example, to alleviate biases and/or improve generalization.

In one example, it may be hard to obtain accurate information for the diversity of the training data.

In some demonstrative aspects, ML architecture processor 124 may be configured to construct the multi-model ML architecture, for example, even without a need to train the ML models, e.g., as described below.

In some demonstrative aspects, for example, in some use cases, scenarios, and/or implementations, there may be a need to address one or more technical issues of techniques configured to enhance a dependability of autonomous systems, e.g., as described below.

For example, some techniques to enhance the dependability of the autonomous systems may be based on simplicity. For example, by reducing a system complexity, many hazards may be eliminated.

In one example, although ML-based approaches may outperform other known techniques, for example, in many perception tasks, current fitting of ML models, e.g., through quantization, pruning, and/or the like, may induce a small but noticeable decrease in algorithmic performance, which may not be acceptable, for example, for some tasks, e.g., demanding and/or mission-critical tasks.

In some demonstrative aspects, ML architecture processor 124 may be configured to construct the multi-model ML architecture, which may be implemented to provide a technical solution based on an automatic mechanism to enhance dependability. For example, an edge/cloud server, e.g., server 170, which may have more compute complexity, may be utilized for complex tasks. For example, such an implementation may support a technical solution utilizing a simpler solution to perform a simpler task, e.g., a fail-degraded behavior task, and/or a fail-safe task, at an edge device, for example, autonomous device 140, e.g., as described below.

In some demonstrative aspects, for example, in some use cases, scenarios, and/or implementations, there may be a need to address one or more technical issues of techniques configured to enhance dependability of autonomous systems based on substitution, for example, by replacing components with more reliable ones.

In one example, some substitution-based techniques ay have high cost. For example, it may be very expensive to replace Commercial Off-The-Shelf (COTS) high-performance HW with dedicated silicon designed for safety, e.g., from the ground up.

In some demonstrative aspects, ML architecture processor 124 may be configured to construct the multi-model ML architecture, which may be implemented to provide a technical solution to reduce computation requirements at autonomous device 140. For example, ML architecture processor 124 may be configured to construct the multi-model ML architecture, which may be implemented to provide a technical solution to enable deployment of reliable hardware, and/or to offload compute-intensive tasks to a server, e.g., server 170, at which COTS hardware may be used. For example, automatic implementation of proven safety architectures may enable using the COTS hardware at the server, e.g., as described below.

In some demonstrative aspects, for example, in some use cases, scenarios, and/or implementations, there may be a need to address one or more technical issues of techniques configured to enhance the dependability of the autonomous systems by performing a validation during lifecycle procedure. For example, the validation during lifecycle procedure may include adaptation of a validation set to accommodate for recent potential changes in an underlying expected real-world inference.

In one example, it may be hard to obtain accurate information for the validation during lifecycle procedure.

In some demonstrative aspects, ML architecture processor 124 may be configured to construct the multi-model ML architecture, which may be implemented to provide a technical solution, which may not require validation and/or retraining of the ML models, e.g., as described below.

In some demonstrative aspects, for example, in some use cases, scenarios, and/or implementations, there may be a need to address one or more technical issues of techniques configured to enhance the dependability of the autonomous systems based on sanity checking techniques. For example, one or more plausibility tests may be utilized to validate an input, a state, and/or outputs of an autonomous system.

In one example, the sanity checking techniques may be limited to prior knowledge of the autonomous system and/or to an environment encoded at a checker.

In some demonstrative aspects, ML architecture processor 124 may be configured to construct the multi-model ML architecture, which may be implemented to provide a technical solution, which may not be limited by sanity checking constraints, and/or which may be orthogonal and complementary, e.g., as described below.

In some demonstrative aspects, for example, in some use cases, scenarios, and/or implementations, there may be a need to address one or more technical issues of techniques configured to enhance the dependability of the autonomous systems based on the use of multiple channels, which may increase system dependability, for example, in a case of a channel failure.

In one example, it may be very expensive to implement the techniques, which based on the use of multiple. For example, in case the multiple channels are diverse, a development cost may be significantly high, and the obtained diversity may be hard or impossible to prove/verify. For example, a hardware cost or latency may be high, for example, when the channel execution is diverse.

In some demonstrative aspects, ML architecture processor 124 may be configured to construct the multi-model ML architecture, which may be implemented to provide a technical solution, which may be automatic, e.g., even without human developer cost.

In some demonstrative aspects, ML architecture processor 124 may be configured to construct the multi-model ML architecture, which may be implemented to provide a technical solution based on a novel metric, which may support deriving diverse channels, e.g., at design or at runtime, whose diversity may be quantified, e.g., as described below.

In some demonstrative aspects, for example, in some use cases, scenarios, and/or implementations, there may be a need to address one or more technical issues of techniques configured to enhance the dependability of the autonomous systems based on functional degradation techniques, for example, to reduce functionality, for example, based on a detected problem. For example, the functional degradation may be discrete according to a manual design.

In some demonstrative aspects, ML architecture processor 124 may be configured to construct the multi-model ML architecture, which may be implemented to provide a technical solution to leverage a ML model generation mechanism, e.g., a NAS technique and/or any other ML model generation mechanism, for example, to obtain a large number of ML models of different sizes. This ability to generate large number of ML models of different sizes may be utilized, for example, to degrade workload performance according to available resources at autonomous device 140, e.g., as described below.

In some demonstrative aspects, for example, in some use cases, scenarios, and/or implementations, there may be a need to address one or more technical issues of techniques configured to enhance the dependability of the autonomous systems based on fail-safe mechanisms. For example, the fail-safe mechanisms, may satisfy safety requirements, for example, by ensuring benign failure modes, e.g., even if one or more components fail.

In one example, in many implementations, a large part, e.g., a biggest part, of the compute resources on autonomous systems may be reserved for a primary channel, while only a smaller part of the computing resources may be dedicated for safety, e.g., as a fail-safe channel.

In some demonstrative aspects, ML architecture processor 124 may be configured to construct the multi-model ML architecture, which may be implemented to provide a technical solution to free up the primary channel from the computation resources of the autonomous device 140, and/or to enable deployment of more capable safety mechanisms, for example, using these freed computation resources, e.g., as described below.

In some demonstrative aspects, for example, in some use cases, scenarios, and/or implementations, there may be a need to address one or more technical issues of techniques configured to enhance the dependability of the autonomous systems based on diverse programming techniques. For example, the diverse programing techniques may create different versions of programs to eliminate errors, for example, by assuming that the different versions may exhibit different failure modes. These different versions of the programs may often be generated manually.

In some demonstrative aspects, for example, in some use cases, scenarios, and/or implementations, there may be a need to address one or more technical issues of techniques configured to enhance the dependability of the autonomous systems based on coded processing techniques. For example, the coded processing techniques may utilize an automatic mechanism to create a plurality of channels through encoding. In one example, the coded processing techniques may be limited to only some use cases, e.g., protecting against platform faults.

In some demonstrative aspects, ML architecture processor 124 may be configured to construct the multi-model ML architecture, which may be implemented to provide a technical solution, which may address a technical requirement to increase a dependability of ML-based tasks of an autonomous system, e.g., as described below.

In some demonstrative aspects, ML architecture processor 124 may be configured to construct the multi-model ML architecture, which may be implemented to provide a technical solution to mitigate a technical limitation to permanently fit a static ML model on device compute resources, e.g., as described below.

In some demonstrative aspects, ML architecture processor 124 may be configured to construct the multi-model ML architecture, which may be implemented to provide an automatic mechanism, which may be based, for example, on design diversity to detect and/or mitigate hazards and/or challenges of an ML model, for example, one or more of hazards 202 (FIG. 2) and/or challenges 206 (FIG. 2), e.g., as described below.

In some demonstrative aspects, ML architecture processor 124 may be configured to construct the multi-model ML architecture, which may be implemented to provide a technical solution, which may support the use of computer resources of sever 170, e.g., when the computing resources of server 170 are available, e.g., as described below.

In some demonstrative aspects, ML architecture processor 124 may be configured to construct the multi-model ML architecture, which may be implemented to provide a technical solution, which may support implementation of a safety model for the autonomous device 140, for example, for use in a fail-safe or a fail-degraded channel of the autonomous device 140, for example, when the computing resources of server 170 are temporarily not available, e.g., as described below.

In some demonstrative aspects, ML architecture processor 124 may be configured to construct the multi-model ML architecture, which may be implemented to provide a technical solution, which may combine diverse ML models, which may potentially reduce common cause failures at an application level, for example, even without compromising a model accuracy, e.g., as described below.

In some demonstrative aspects, ML architecture processor 124 may be configured to construct the multi-model ML architecture, which may be implemented to provide a technical solution to protect against various faults, e.g., as described below.

In some demonstrative aspects, computing device 102 may be configured to construct a multi-model ML architecture to be executed, implemented and/or operated at server device 170 and/or autonomous robot device 140, e.g., as described below.

In some demonstrative aspects, computing device 102 may include an input 106 configured to receive ML model information 108 corresponding to an ML model to process input information, e.g., as described below.

For example, the input information 108 may correspond to input information 142 of autonomous device 140.

In some demonstrative aspects, ML architecture processor 124 may be configured to construct a multi-model ML architecture based on the ML model, e.g., as described below.

In some demonstrative aspects, ML architecture processor 124 may be configured to construct the multi-model ML architecture including a plurality of ML model variants, for example, based on the ML model, e.g., as described below.

In some demonstrative aspects, ML architecture processor 124 may be configured to determine the plurality of ML model variants, for example, based on an attribution-based diversity metric corresponding to a model group including two or more model variants, e.g., as described below.

In some demonstrative aspects, the model group may include at least a first ML model variant and a second ML model variant, e.g., as described below.

In some demonstrative aspects, the attribution-based diversity metric corresponding to the model group may be based on a diversity between a first attribution scheme and a second attribution scheme, e.g., as described below.

In some demonstrative aspects, the first attribution scheme may represent one or more first portions of the input information 108 attributing to an output of the first ML model variant, and/or the second attribution scheme may represent one or more second portions of the input information 108 attributing to an output of the second ML model variant, e.g., as described below.

In some demonstrative aspects, ML architecture processor 124 may be configured to determine a plurality of diversity metric scores corresponding to a plurality of groups of ML models, e.g., as described below.

In some demonstrative aspects, ML architecture processor 124 may be configured to determine a first diversity metric score corresponding to a first group of ML models, and to determine a second diversity metric score corresponding to a second group of ML models, e.g., as described below.

In some demonstrative aspects, the diversity metric score corresponding to a group of ML models may be based on the diversity between attribution schemes of ML models in the group of ML models, e.g., as described below.

In some demonstrative aspects, the first diversity metric score corresponding to the first group of ML models may be higher than the second diversity metric score corresponding to the second group of ML models, for example, when a diversity between attribution schemes of ML models in the first group of ML models is greater than a diversity between attribution schemes of ML models in the second group of ML models, e.g., as described below.

In some demonstrative aspects, ML architecture processor 124 may be configured to generate the plurality of ML model variants, for example, based on the attribution-based diversity metric, e.g., as described below.

In some demonstrative aspects, ML architecture processor 124 may be configured to determine a plurality of derived ML models, for example, based on the ML model, e.g., as described below.

In some demonstrative aspects, ML architecture processor 124 may be configured to select the plurality of ML model variants from the plurality of derived ML models, for example, based on the attribution-based diversity metric, e.g., as described below.

In some demonstrative aspects, ML architecture processor 124 may be configured to generate the plurality of derived ML models, for example, based on a Neural Architecture Search (NAS), e.g., as described below.

In other aspects, ML architecture processor 124 may be configured to generate the plurality of derived ML models, for example, based on any other mechanism and/or technique.

In some demonstrative aspects, ML architecture processor 124 may be configured to select a plurality of ML model candidates from the plurality of derived ML models, e.g., as described below.

In some demonstrative aspects, ML architecture processor 124 may be configured to select the plurality of ML model variants from the plurality of ML model candidates, for example, based on the attribution-based diversity metric, e.g., as described below.

In some demonstrative aspects, ML architecture processor 124 may be configured to select the plurality of ML model candidates from the plurality of derived ML models based, for example, on a performance criterion corresponding to performance of the plurality of derived ML models, e.g., as described below.

In some demonstrative aspects, ML architecture processor 124 may be configured to select the plurality of ML model variants from the plurality of derived ML models, for example, based on a performance criterion corresponding to performance of the plurality of derived ML models, e.g., as described below.

In some demonstrative aspects, ML architecture processor 124 may be configured to select the plurality of ML model candidates from the plurality of derived ML models, for example, based on the attribution-based diversity metric, and to select the plurality of ML model variants from the plurality of ML model candidates, e.g., as described below In some demonstrative aspects, ML architecture processor 124 may be configured to determine a plurality of attribution-based diversity metric scores corresponding to a plurality of model groups (also referred to as "ensembles"), e.g., as described below.

In some demonstrative aspects, ML architecture processor 124 may be configured to select the plurality of ML model variants from the plurality of derived ML models, for example, based on the plurality of attribution-based diversity metric scores, e.g., as described below.

In some demonstrative aspects, ML architecture processor 124 may be configured determine a plurality of performance scores corresponding to the plurality of model groups, and to select the plurality of ML model variants from the plurality of derived ML models, for example, based on the plurality of performance scores, e.g., as described below.

In some demonstrative aspects, ML architecture processor 124 may be configured to determine the multi-model ML architecture, for example, based on the attribution-based diversity metric, e.g., as described below.

In some demonstrative aspects, ML architecture processor 124 may be configured to select the multi-model ML architecture from a plurality of multi-model ML architectures, based on one or more architecture selection criteria, e.g., as described below.

In some demonstrative aspects, ML architecture processor 124 may be configured to select the multi-model ML architecture from a plurality of multi-model ML architectures, for example, based on computing resources of a computing device, e.g., device 102, device 140 and/or server 170, to execute one or more of the plurality of ML model variants, e.g., as described below.

In some demonstrative aspects, ML architecture processor 124 may be configured to select the multi-model ML architecture from the plurality of multi-model ML architectures, for example, based on one or more functional requirements of the multi-model ML architecture, e.g., as described below.

In some demonstrative aspects, ML architecture processor 124 may be configured to select the multi-model ML architecture from the plurality of multi-model ML architectures, for example, based on a hazard criterion corresponding to one or more hazards, e.g., hazards 202 (FIG. 2), which may have potential to degrade performance of the ML model, e.g., as described below.

In some demonstrative aspects, ML architecture processor 124 may be configured to determine the multi-model ML architecture including a first plurality of ML model variants to be executed on a first computing device, and a second plurality of ML model variants to be executed on a second computing device, e.g., as described below.

In some demonstrative aspects, the one or more first ML model variants may be configured to perform one or more first parts of a task, and/or the one or more second ML model variants may be configured to perform one or more second parts of the task, e.g., as described below.

In some demonstrative aspects, ML architecture processor 124 may be configured to determine the first plurality of ML model variants, for example, based on computing resources of the first computing device, and/or to determine the second plurality of ML model variants, for example, based on computing resources of the second computing device, e.g., as described below.

In some demonstrative aspects, ML architecture processor 124 may be configured to execute the first plurality of ML model variants, e.g., as described below.

In some demonstrative aspects, ML architecture processor 124 may be configured to provide the second plurality of ML model variants to the second computing device, for example, the autonomous device 140, e.g., as described below.

In some demonstrative aspects, ML architecture processor 124 may be configured to perform the one or more first parts of the task, and/or the second computing device may be configured to perform the one or more second parts of the task, e.g., as described below.

In some demonstrative aspects, the one or more second parts of the task may include fail-safe operations corresponding to one or more fail-safe events of the task, which may be performed, for example, by autonomous device 140, e.g., as described below.

In some demonstrative aspects, the one or more second parts of the task may include safety operations corresponding to one or more safety events, e.g., as described below.

In other aspects, the one or more first parts of the task and/or the one or more second parts of the task may include any other operations, and/or functionalities.

In some demonstrative aspects, the first computing device may include a server, and/or the second computing device may include an autonomous robot, e.g., as described below.

In one example, the first computing device may include server 170, and the second computing device may include autonomous device 140. According to this example, server 170 may be configured to execute the first plurality of ML model variants, for example, to perform the one or more first parts of the task, and/or autonomous device 140 may be configured to execute the second plurality of ML model variants, for example, to perform the one or more second parts of the task, e.g., as described below.

In some demonstrative aspects, the ML model may include an image classification ML model to process image information of an image, e.g., as described below. For example, the ML model may include an image classification ML model to process image information in input information 142.

In some demonstrative aspects, an attribution scheme corresponding to the image information may represent one or more pixels of the image attributing to an output of an ML model variant, e.g., as described below.

In some demonstrative aspects, an attribution scheme corresponding to the image information may represent a level of attribution of one or more pixels of the image to an output of an ML model variant, e.g., as described below.

In some demonstrative aspects, a first attribution scheme may represent one or more pixels of the image attributing to an output of a first ML model variant, and/or a second attribution scheme may represent one or more second pixels of the image attributing to an output of a second ML model variant, e.g., as described below.

In some demonstrative aspects, a first attribution scheme may represent a level of attribution of one or more pixels of the image to an output of a first ML model variant, and/or a second attribution scheme may represent a level of attribution of one or more second pixels of the image to an output of a second ML model variant, e.g., as described below.

For example, a first attribution scheme may represent a level of importance of one or more pixels of the image attributing to an output of a first ML model variant, and/or a second attribution scheme may represent a level of importance of one or more second pixels of the image attributing to an output of a second ML model variant, e.g., as described below.

In one example, an attribution scheme corresponding to the image information may include a map of a plurality of attribution values corresponding to a plurality of pixels of the image. For example, an attribution value corresponding to a pixel may represent how important the pixel is in attributing to the output of the ML model variant.

In one example, attribution scheme corresponding to the image information may include one or more attribution values corresponding to a pixel of the image. For example, the attribution scheme corresponding to the image information may include a plurality of attribution values per pixel of the image. In one example, the attribution scheme corresponding to the image information may include three attribution values per pixel of the image, for example, corresponding to three color channels of a color pixel in a color image.

In other aspects, the ML model may include any other ML model to process any other additional type of input information 142.

Figure 3:
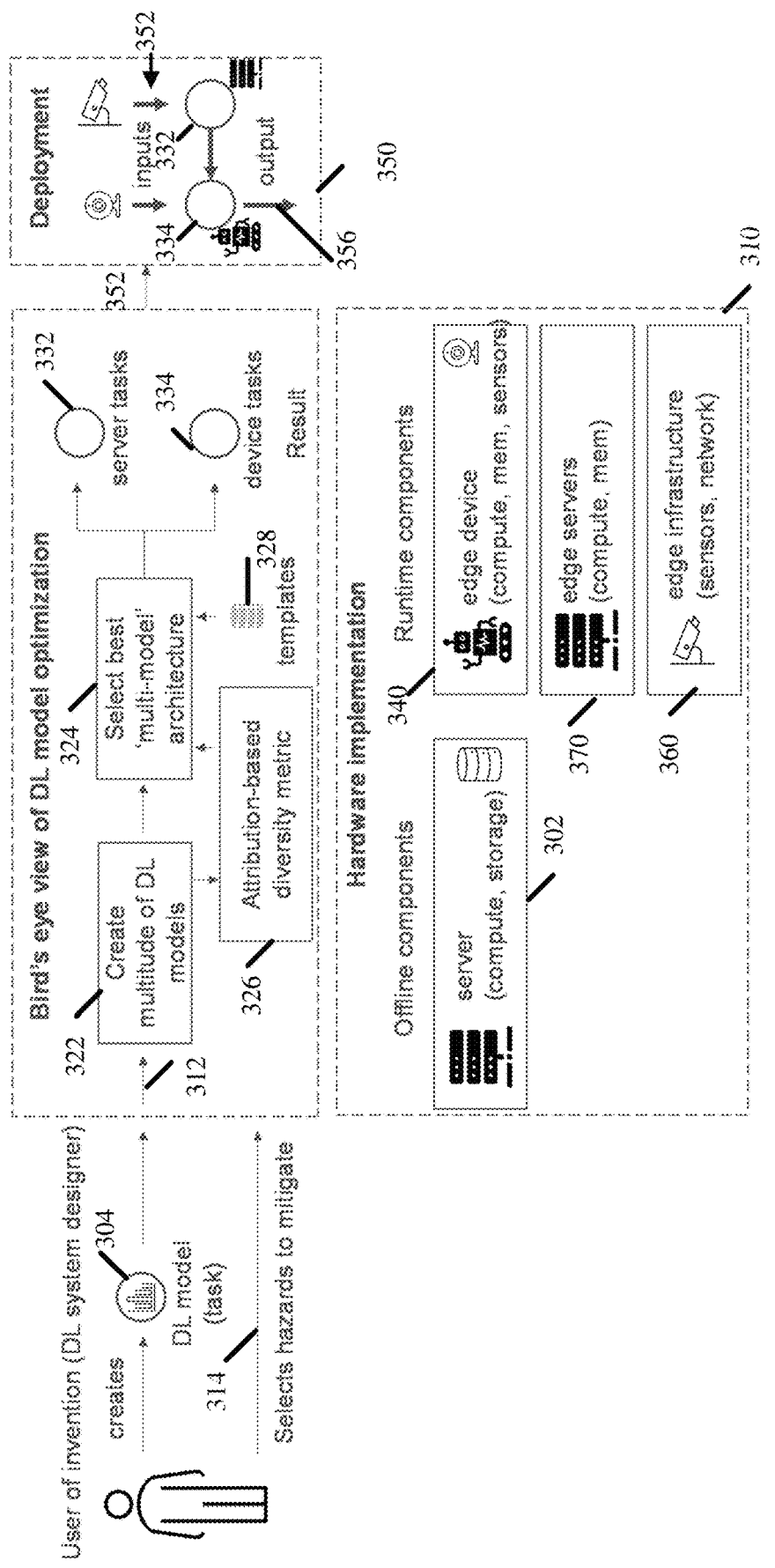
FIG. 3 is a schematic illustration of a construction scheme to construct a multi-model ML architecture, in accordance with some demonstrative.

Reference is made to FIG. 3, which schematically illustrates a construction scheme 300 to construct a multi-model ML architecture, in accordance with some demonstrative aspects.

In some demonstrative aspects, as shown in FIG. 3, construction scheme 300 may be implemented utilizing one or more hardware components 310 including, for example, a computing device 302, e.g., which may be implemented by server device and/or any other computing device; an edge device 340, e.g., an autonomous robot; and/or one or more servers 370, e.g., edge servers 370. For example, computing device 102 (FIG. 1) may include one or more elements of computing device 302, and/or may perform one or more operations and/or functionalities of computing device 302; autonomous device 140 (FIG. 1) may include one or more elements of edge device 340, and/or may perform one or more operations and/or functionalities of edge device 340; and/or server device 170 (FIG. 1) may include one or more elements of edge servers 370, and/or may perform one or more operations and/or functionalities of edge servers 370.

In some demonstrative aspects, as shown in FIG. 3, hardware components 310 may include an infrastructure 360 including one or more infrastructure components, for example, sensors, a wireless/wired network, and/or the like.

In some demonstrative aspects, as shown in FIG. 3, construction scheme 300 may be configured to process ML model information 312 corresponding to an ML model 304.

In some demonstrative aspects, as shown in FIG. 3, construction scheme 300 may be configured to determine a plurality of hazards of an ML-based system, which may be, for example, mitigated.

In some demonstrative aspects, as indicated in a block 322 a plurality of derived ML models may be created, for example, based on the ML model 304.

In some demonstrative aspects, as indicated in a block 324, a multi-model ML architecture including a plurality of ML model variants may be selected, for example, based on an attribution-based diversity metric 326.

In some demonstrative aspects, the plurality of ML model variants may be selected from the plurality of derived ML models.

In some demonstrative aspects, the multi-model ML architecture may be selected from a plurality of predefined multi-model ML architectures ("templates") 328.

In some demonstrative aspects, as shown in FIG. 3, the selected multi-model ML architecture may include one or more ML model variants 332 to be executed by edge servers 370, and/or one or more ML model variants 334 to be executed by edge device 340.

In some demonstrative aspects, ML architecture processor 124 (FIG. 1) may be configured to implement one or more operations and/or functionalities of blocks 322 and/or 324, for example, to generate the multi-model ML architecture including the ML variants 332 and/or 334.

In some demonstrative aspects, as shown in FIG. 3, a deployment 350 of the multi-model ML architecture may include processing input information 352 at edge servers 370, and executing the one or more ML model variants 332 based on input information 352, e.g., at edge servers 370.

In some demonstrative aspects, as shown in FIG. 3, the deployment 350 of the multi-model ML architecture may include processing input information 352 at edge device 340, and executing the one or more ML model variants 334 based on input information 352, e.g., at edge device 340.

In some demonstrative aspects, as shown in FIG. 3, execution of the ML-model architecture may result in an output 356 corresponding to a task to be performed by the edge device 340.

Figure 4:
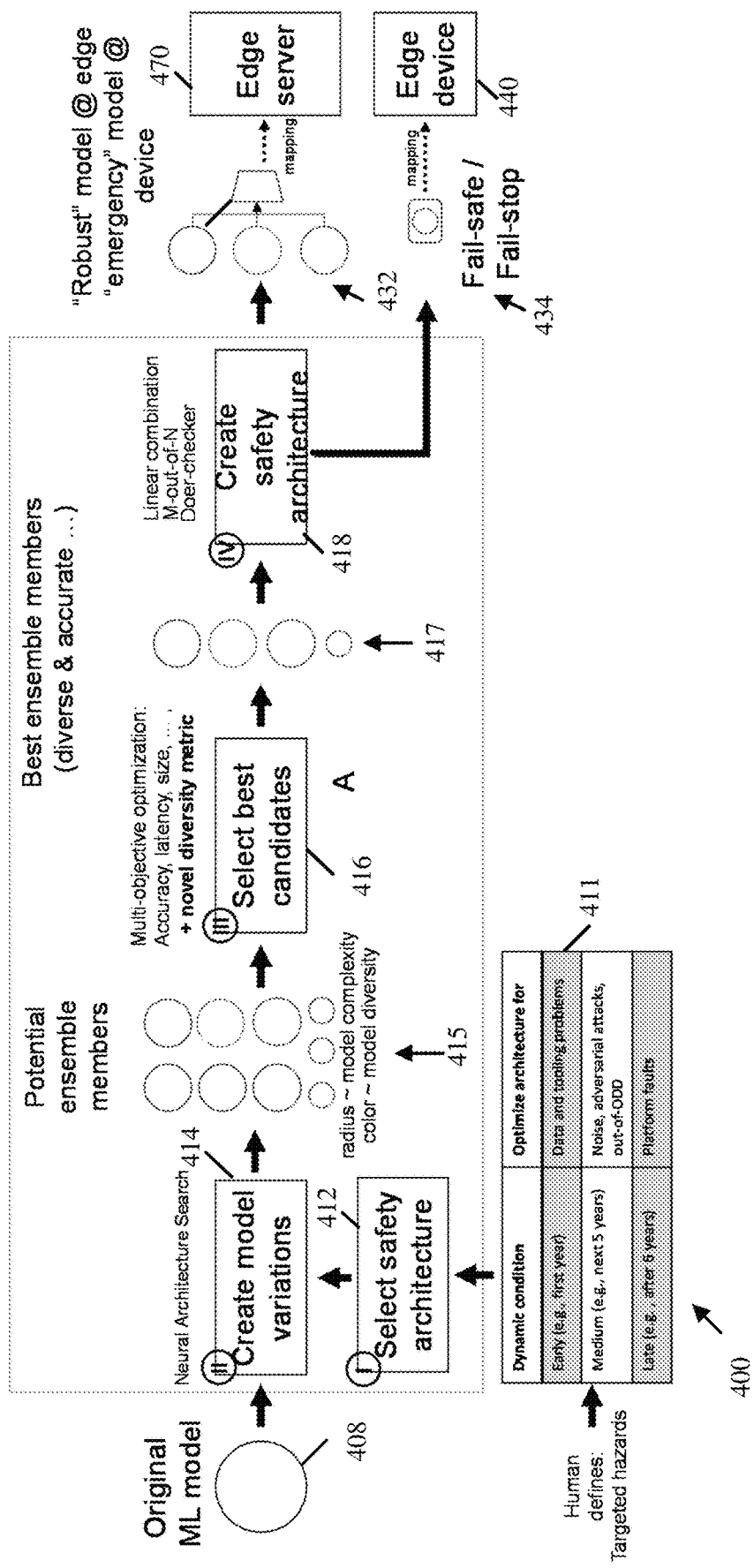
FIG. 4 is a schematic illustration of a construction scheme to construct a multi-model ML architecture, in accordance with some demonstrative.

Reference is made to FIG. 4, which schematically illustrates a ML architecture construction scheme 400 to construct a multi-model ML architecture, in accordance with some demonstrative aspects.

In some demonstrative aspects, as shown in FIG. 4, ML architecture construction scheme 400 may include one or more operations, for example, to construct the multi-model ML architecture, e.g., as described below.

In some demonstrative aspects, as shown in FIG. 4, the operations of ML architecture construction scheme 400 may be implemented by a computing device, e.g., ML architecture processor 124 (FIG. 1) of computing device 102 (FIG. 1).

In some demonstrative aspects, as indicated at block 412, ML architecture construction scheme 400 may include selecting a multi-model ML architecture, for example, based on one or more conditions and/or KPIs 411, e.g., as described below.

In some demonstrative aspects, as indicated at block 414, ML architecture construction scheme 400 may include determining a plurality of derived ML models 415, for example, based on ML model information corresponding to an ML model 408, e.g., as described below.

In one example, a derived ML model 415, e.g., each derived ML model 415, may be represented by a circle, the size of the circle may represent a model size and a color of the circle may represent a diversity between two ML models. For example, models using different evidence of the input information and providing the same output may have a different color.

In some demonstrative aspects, as indicated at block 416, ML architecture construction scheme 400 may include selecting a plurality of ML-model candidates 417, for example, from the plurality of derived ML models 415, e.g., as described below.

In some demonstrative aspects, the plurality of ML-model candidates 417 may include one or more derived ML models 432 to be executed on a server device 470 (also referred to as "edge server"), e.g., server device 170 (FIG. 1), and/or one or more derived ML models 434 to be executed on an autonomous device 440 (also referred to as "edge device"), e.g., autonomous device 140 (FIG. 1), e.g., as described below.

For example, autonomous device 140 (FIG. 1) may include one or more elements of edge device 440, and/or may perform one or more operations and/or functionalities of edge device 440, and/or server device 170 (FIG. 1) may include one or more elements of edge server 470, and/or may perform one or more operations and/or functionalities of edge servers 470.

In some demonstrative aspects, as indicated at block 418, ML architecture construction scheme 400 may include constructing the multi-model ML architecture, for example, from the plurality of ML-model candidates 417, e.g., as described below.

In some demonstrative aspects, as shown in FIG. 4, the multi-model ML architecture may be configured, for example, such that server 470 and/or edge device 440 may execute a task, for example, according to the multi-model ML architecture.

In some demonstrative aspects, as shown in FIG. 4, ML architecture construction scheme 400 may be configured to automatically transform the ML model 408 into a safety architecture, for example, based on ensembles, e.g., at the edge server 470 and/or the edge device 440.

In some demonstrative aspects, the attribution-based diversity metric may be used to derive diverse ensemble members to be utilized at the edge server 470, e.g., to improve important KPIs.

In some demonstrative aspects, the attribution-based diversity metric may be used to derive diverse ensemble members to be utilized by the edge device 440, e.g., to determine a fitted ML model, which may be suited for use in fail-safe/fail-degraded functionality, and/or any other functionality, at the edge device 440.

In one example, as shown in FIG. 4, the selected multi-model ML architecture may include a safety architecture based on an M-out-of-N pattern, which may be configured to be deployed at the edge server 470, and/or a fail-safe channel, which may be configured to be deployed at the edge device 440.

In some demonstrative aspects, ML architecture construction scheme 400 may be implemented based on the attribution-based diversity metric, for example, for creation of a plurality of diverse model groups, e.g., a plurality of diverse ensembles, as described below.

In some demonstrative aspects, the attribution-based diversity metric may be configured based on diversity of input attributions, e.g., saliency maps, of models during inference. For example, the attribution-based diversity metric may consider what elements of the input information were uniquely important, to infer an output of an ML model, and/or what elements of the input were common to all ML models, e.g., as described below.

Figure 5:
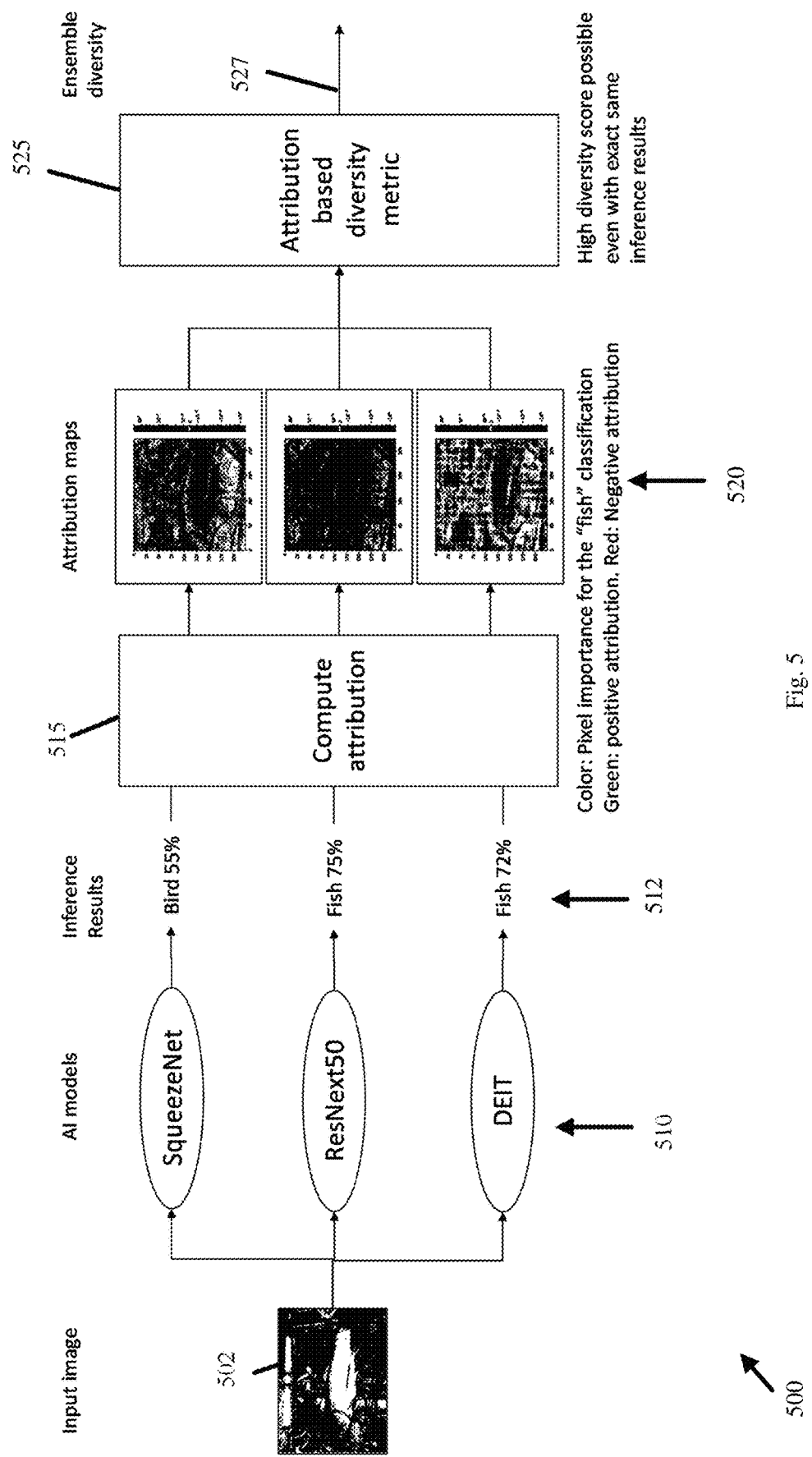
FIG. 5 is a schematic illustration of a scheme to determine an attribution-based diversity metric, in accordance with some demonstrative aspects.

Reference is made to FIG. 5, which schematically a scheme 500 to determine an attribution-based diversity metric, in accordance with some demonstrative aspects.

In some demonstrative aspects, as shown in FIG. 5, a plurality of ML models 510 may process an input image 502, e.g., an image of a fish.

In some demonstrative aspects, as shown in FIG. 5, the plurality of ML models 510 may output a plurality of classification results 512 corresponding to the input image 502, e.g., a bird, a fish, and/or any other classification output.

In some demonstrative aspects, as indicated at block 515, scheme 500 may include determining a plurality of attribution maps 520 corresponding to the plurality of ML models 510. For example, an attribution map 520 for an ML model 510 may identify which pixels in input image 502 contribute to the plurality of classification results 512 of the ML model 510.

In one example, an attribution map 520 may include a saliency map including first pixels having positive attribution to the output 512, and/or second pixels having negative attribution to the output 512.

In some demonstrative aspects, as shown in FIG. 5, different ML models 510 may consider different pixels of the input image 502 to generate the classification results 512.

In some demonstrative aspects, as indicated at block 525, an attribution-based diversity metric score 527 may be determined for a model group including ML models 510, for example, based on diversity of the pixels in attribution maps 520 that contribute to the classification results 512.

In one example, a high diversity score may be determined, for example, even if the ML models 510 provide a same result. For example, a high diversity score may be determined, for example, when different pixels contribute to the same results.

In some demonstrative aspects, as shown in FIG. 5, an ensemble model, e.g., each ML model 510, may perform inference on the same image 502, and an attribution map 520 corresponding the target label, e.g., an output or classification result 512 of the ML model 510, may be computed.

In some demonstrative aspects, as shown in FIG. 5, the attribution map 520 may describe, which pixels, e.g., in the case of images, positively or negatively contributed to a final inference result, e.g., the output 512. For example, parts of the body of the fish may be very important to classify the input image 502 as fish for a first ML model 510, e.g., a ResNext50 ML model, while only a subset of the tail was important to classify the input image 502 as fish by a second ML model 510, e.g., a DEIT ML model.

In some demonstrative aspects, as shown in FIG. 5, the attribution-based diversity metric score 527 may be computed based on the attribution maps 520, for example, to determine how much diverse evidence was used in the ensemble, e.g., the ML group, to determine outputs 512.

In some demonstrative aspects, different ensembles, e.g., including different ML models, may be compared, for example, based on their attribution-based diversity metric score 527.

Some demonstrative aspects are described with respect to determining an attribution-based diversity metric based on pixels of an image, e.g., as described above. However, in other aspects, the attribution-based diversity metric may be determined based on any other type and/or part of the input information attributing to an output of the ML model.

Referring back to FIG. 4, in some demonstrative aspects, the plurality of derived ML models 415 may be automatically derived from variations of model 408, for example, based on a NAS mechanism and/or any other model-derivation mechanism, e.g., as described below.

In one example, an efficient One-Shot, Weight-sharing NAS technique may be used to produce a multitude of ML models having varying complexity, for example, even without a need to re-train each of the plurality of ML models 415.

In another example, any other additional and/or alternative technique may be used, for example, to produce the plurality of ML models 415.

Figure 6:
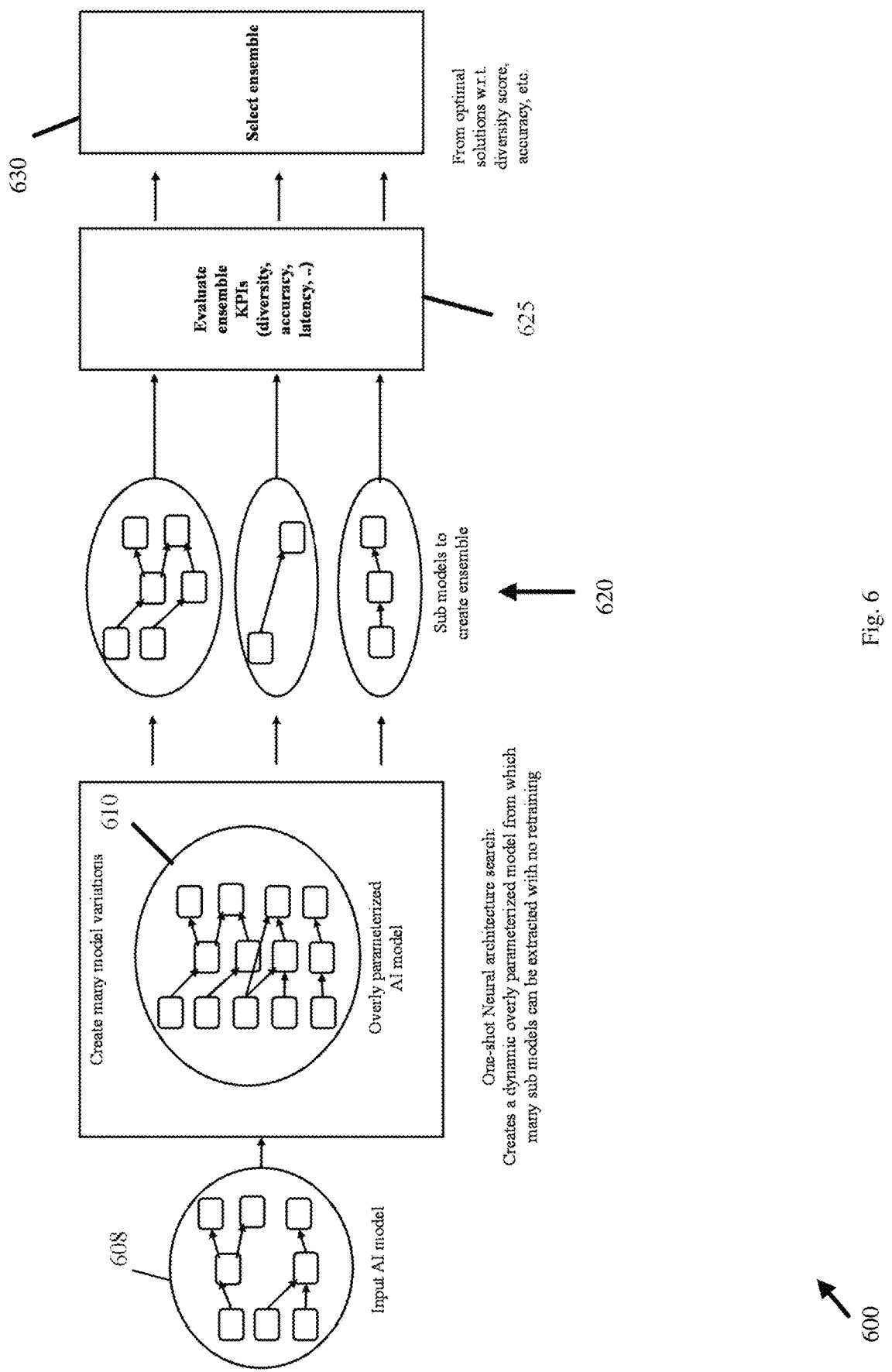
FIG. 6 is a schematic illustration of a scheme to generate ML model derivations, in accordance with some demonstrative aspects.

Reference is made to FIG. 6, which schematically illustrates an ML model derivation scheme 600, which may be implemented in accordance with some demonstrative aspects.

In some demonstrative aspects, as shown in FIG. 6, ML model derivation scheme 600 may be configured to process an ML model 608, e.g., ML model 408 (FIG. 4).

In some demonstrative aspects, as shown in FIG. 6, ML model derivation scheme 600 may be configured to create a dynamic overly parameterized model 610, e.g., from which a plurality of sub models 620 may be extracted, for example, even without retraining.

In some demonstrative aspects, as shown in FIG. 6, ML model derivation scheme 600 may be configured to create a big set including a plurality of derived ML model variants 620, for example, from the dynamic overly parameterized model 610.

In some demonstrative aspects, the plurality of derived ML model variants 620 may perform the same task of ML model 608, for example, through different architectures, for example, characterized by a different number of layers, kernel sizes, width, and/or the like.

In some demonstrative aspects, a plurality of model groups, e.g., ensembles, may be created, for example, based on the plurality of derived ML model variants 620.

In some demonstrative aspects, as indicated at block 625, one or more selection metrics, e.g., including an attribution-based diversity metric and/or one or more other performance metrics, may be determined for an ensemble, e.g., for each ensemble.

In some demonstrative aspects, as indicated at block 630, ML model derivation scheme 600 may be configured to select a selected ensemble, for example, based on the attribution-based diversity metric and/or the one or more other performance metrics.

In some demonstrative aspects, the ML model variants of the selected ensemble may be combined, e.g., at an edge server, e.g., edge server 470 (FIG. 4). For example, the ML model variants of the selected ensemble may be combined based on different consensus mechanisms, for example, to match a multi-model ML architecture, e.g., as described below.

In some demonstrative aspects, the ML model variants of the selected ensemble may be combined, for example, based on a linear combination, for example, to provide a technical solution supporting increased performance.

In some demonstrative aspects, ML model variants of the selected ensemble may be combined, for example, based on a majority voting, for example, to provide a technical solution supporting improved integrity, improved reliability, and/or improved uncertainty estimation/reasoning using the attribution-based diversity metric at runtime.

In some demonstrative aspects, the ML model variants of the selected ensemble may be combined based on any other additional or alternative mechanisms.

In some demonstrative aspects, a compact model suited for use in a fail-safe/fail-degraded operation, e.g., including time supervision such as timeout, and/or any other mechanism, may be applied, for example, at an edge device, e.g., edge device 440 (FIG. 4).

Referring back to FIG. 4, in some demonstrative aspects, ML architecture construction scheme 400 may be utilized to construct a multi-model ML architecture based on the attribution-based diversity metric, for example, to provide one or more technical solutions and/or advantages, e.g., as described below.

In some demonstrative aspects, ML architecture construction scheme 400 may be configured to provide a technical solution, in which a size of each ML model 415 may be less constrained, for example, compared to other construction schemes, e.g., as described below.

In some demonstrative aspects, ML architecture construction scheme 400 may be configured to provide a technical solution, in which a size of a fail-safe channel, e.g., at edge device 440, may be less constrained, for example, compared to other construction schemes, e.g., as described below.

In some demonstrative aspects, ML architecture construction scheme 400 may be configured to provide a technical solution, which may support a fault-tolerance, for example, against random HW faults, e.g., as described below.

In some demonstrative aspects, ML architecture construction scheme 400 may be configured to provide a technical solution to provide improved application-level KPIs, for example, robustness, generalizability, uncertainty estimation, and/or any other KPIs, e.g., as described below.

In some demonstrative aspects, ML architecture construction scheme 400 may be configured to provide a technical solution to avoid an accuracy trade-off, e.g., as described below.

In some demonstrative aspects, ML architecture construction scheme 400 may be configured to provide a technical solution, in which ensemble members may be diverse and not only redundant copies, for example, to address application-level failures, e.g., as described below.

In some demonstrative aspects, ML architecture construction scheme 400 may be configured to provide a technical solution, in which one or more of the ensemble members may be deployed at the edges server 470, for example, to remove size constraints and/or improve robustness.

In some demonstrative aspects, ML architecture construction scheme 400 may be configured to provide a technical solution, which may support a diversity selection metric, e.g., the attribution-based diversity metric, which may not be based on an output of an individual ML model. For example, the attribution-based diversity metric may be utilized to avoid compromise in accuracy.

In some demonstrative aspects, ML architecture construction scheme 400 may be configured to provide a technical solution, which may support efficient modification of the multi-model ML architecture, for example, by ML architecture processor 124 (FIG. 1). For example, ML architecture processor 124 (FIG. 1) may be configured to modify a selected multi-model ML architecture, and/or the selected ensemble members of the multi-model ML architecture, for example, to address one or more fault categories, for example, a most relevant fault category, e.g., according to some heuristic. For example, ML architecture construction scheme 400 may be modified by manual control or automatic control during a product life cycle. For example, ML architecture construction scheme 400 may be modified, for example, during a first period, e.g., based on data and/or tooling problems, during mid-life, e.g., based on OOD data, noise, attacks, and/or during a late phase, e.g., based on platform faults.

In some demonstrative aspects, ML architecture construction scheme 400 may be configured to provide a technical solution to support a new mechanism for validating OOD data, e.g., as described below.

In some demonstrative aspects, ML architecture construction scheme 400 may be configured to provide a technical solution, for example, to increase the accuracy of ML models, for example, while not compromising diversity, e.g., as described below.

In some demonstrative aspects, ML architecture construction scheme 400 may be configured to provide a technical solution, for example, to enables an automatic creation of diverse ML models at an edge server, e.g., edge server 470, and/or robust "fail safe models" at an edge device, e.g., edge device 440, e.g., as described below.

In some demonstrative aspects, ML architecture construction scheme 400 may be configured to provide a technical solution, for example, to reduce common cause failures, for example, to reduce a residual risk, e.g., as described below.

In some demonstrative aspects, ML architecture construction scheme 400 may be configured to provide a technical solution, which may reduce KPI constraints imposed on application models, for example, due to device platform limitations, e.g., as described below.

For example, ML architecture construction scheme 400 may be configured to provide a technical solution, which may enable use of resources of an edge/cloud server, e.g., edge server 470, for example, based on automatic generation of the multi-model ML architecture. For example, the automatic generation of the multi-model ML architecture may include generation of a fail-safe/fail-degraded model to be deployed at the edge device 440, and/or a dependability enhanced mode to be deployed at the edge/cloud server 470, for example, for normal operation, e.g., as described below.

In some demonstrative aspects, ML architecture construction scheme 400 may be configured to provide a technical solution to evaluate diversity based on the attribution-based diversity metric, for example, in a manner, which may not impose a trade-off between accuracy and diversity, e.g., as described below.

In some demonstrative aspects, ML architecture construction scheme 400 may be configured to provide a technical solution to optimize an original ML model and to enhance its dependability, for example, when edge server resources are available, e.g., as described below.

In some demonstrative aspects, ML architecture construction scheme 400 may be configured to provide a technical solution to create a fitted device ML model for an edge device, e.g., edge device 440, for example, for use in fail-safe/fail-degraded operations, for example, when the server resources are not available, e.g., as described below.

In some demonstrative aspects, ML architecture construction scheme 400 may be configured to provide a technical solution, which may be used at runtime and/or at design time, for example, to automatically enhance dependability of a ML workload of an autonomous system. For example, using server resources to implement a safety architecture, e.g., the multi-model ML architecture, may free resources of the edge device 440, for example, to implement an enhanced fail-safe or fail-degraded behavior, e.g., as described below.

In some demonstrative aspects, ML architecture construction scheme 400 may be configured to provide a technical solution, which may be based on a combination of a ML model derivation technique, for example, an efficient one-shot NAS technique, e.g., ML model derivation scheme 600 (FIG. 6), and an evidence-based diversity metric, e.g., attribution-based diversity scheme 500 (FIG. 5).

In some demonstrative aspects, ML architecture construction scheme 400 may be configured to provide a technical solution to use the one-shot NAS technique to derive a set of models of varying complexity, e.g., ML models 432, and/or to deploy redundant channels at the edge server 470, and/or emergency channels at the edge device 440, e.g., as described below.

In some demonstrative aspects, ML architecture construction scheme 400 may be configured to provide a technical solution to use the attribution-based diversity metric as an optimization proxy, for example, to minimize common failures of one or more, e.g., each, of the derived channels, e.g., the ML Models 432.

In some demonstrative aspects, ML architecture construction scheme 400 may be configured to provide a technical solution to instantiate a safety architecture, which may address different system hazards, for example, model problems and/or platform faults, e.g., as described below.

In some demonstrative aspects, ML architecture construction scheme 400 may be configured to provide a technical solution, to adapt the multi-model ML architecture automatically. For example, different ML models may be selected and combined as appropriate. For example, the multi-model ML architecture may be adapted automatically, e.g., as relevant system hazards may vary in time. For example, modeling problems may be a bigger problem just after system deployment, while certain platform faults may appear later, for example, at the very beginning of lifecycle or at the very end of the life cycle.

In some demonstrative aspects, the multi-model ML architecture may be adapted based, for example, on a first approach including offline preparation and runtime configuration of the multi-model ML architecture, e.g., as described below.

In some demonstrative aspects, according to the first approach, selection of ML models to be used in potential safety architectures and/or as pre-configured safety architecture options may be done offline.

In some demonstrative aspects, according to the first approach, a set of preconfigured safety architecture options may be switched dynamically, e.g., at runtime, for example, on-demand and/or by a preconfigured policy.

In some demonstrative aspects, the first approach may be suitable, for example, for scenarios, in which a set of preferred system architecture solutions may be defined for established conditions.

In other aspects, the first approach may be utilized for any other scenario and/or deployment.

In some demonstrative aspects, the multi-model ML architecture may be adapted based, for example, on a second approach including full dynamic adaptation of the multi-model ML architecture, for example, at runtime, e.g., as described below.

In some demonstrative aspects, according to the second approach, the selection of ML models to be used in potential safety architectures and/or the selection of the safety architecture configuration may be performed at runtime.

In some demonstrative aspects, the second approach may be more flexible and useful, for example, for scenarios in which availability of resources of an edge/cloud server, e.g., edge server 470, may change dynamically. For example, the second approach may be suitable in a factory scenario, for example, where an autonomous robot uses distributed server resources at different locations.

In other aspects, the second approach may be utilized for any other scenario and/or deployment.

Figure 7:
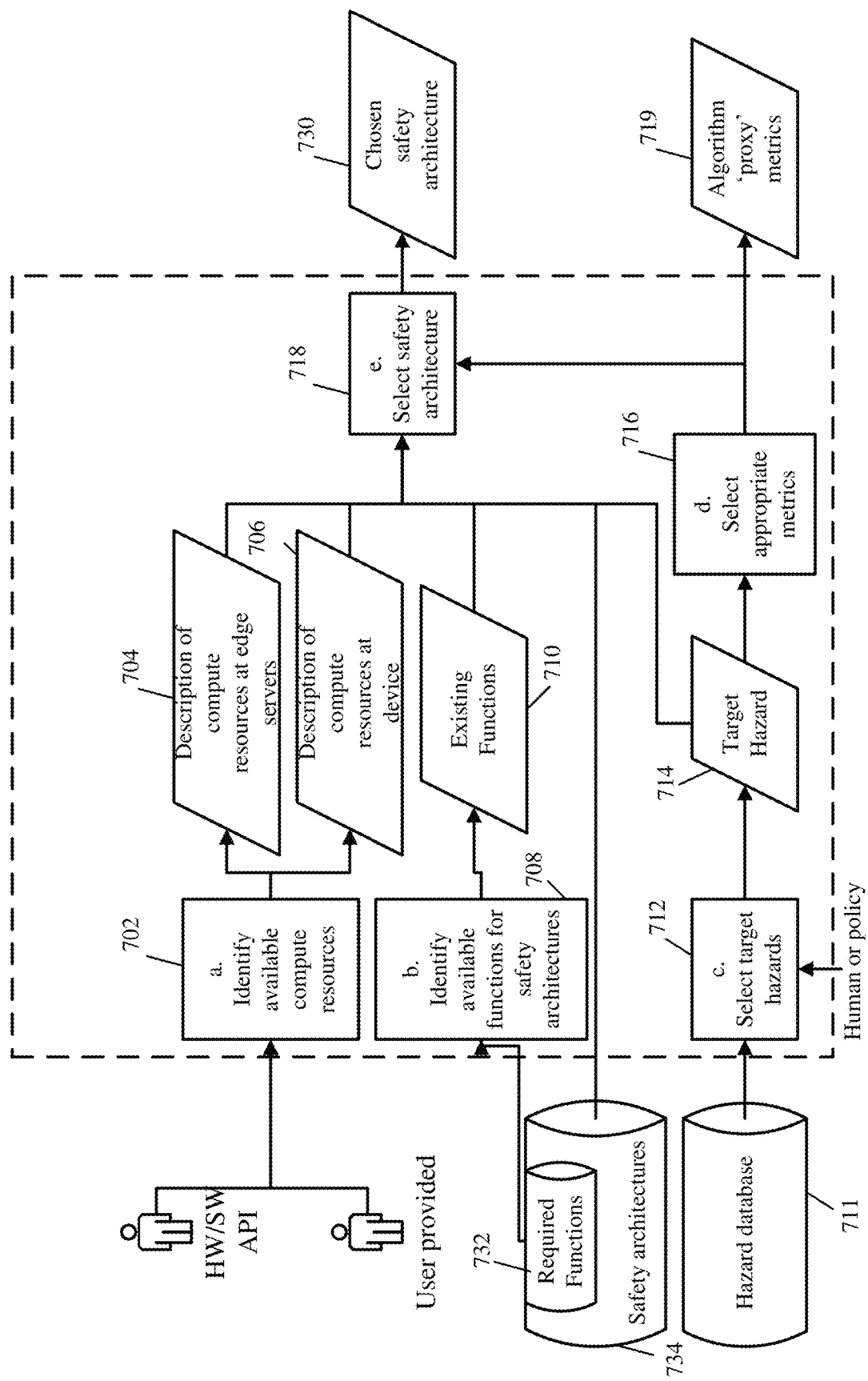
FIG. 7 is a schematic illustration of a multi-model ML architecture selection scheme, in accordance with some demonstrative aspects.

Reference is made to FIG. 7, which schematically illustrates a multi-model ML architecture selection scheme 700, in accordance with some demonstrative aspects.

In one example, ML architecture processor 124 (FIG. 1) may perform one or more operations of multi-model ML architecture selection scheme 700, for example, to select a multi-model ML architecture.

In another example, one or more operations of block 414 (FIG. 4) of ML architecture construction scheme 400 (FIG. 4) may be based on one or more operations of multi-model ML architecture selection scheme 700.

In some demonstrative aspects, as indicated at block 702, multi-model ML architecture selection scheme 700 may include identifying available computing resources, e.g., at an edge server and/or an edge device.

In some demonstrative aspects, as shown in FIG. 7, the available computing resources may be identified based on a user input, e.g., specs, and/or an input from a HW/SW API.

In some demonstrative aspects, as shown in FIG. 7, multi-model ML architecture selection scheme 700 may include determining a list and/or a description of compute resources 704 at the edge server, for example, based on the identified available computing resources of the server device, e.g., as described below.

In some demonstrative aspects, as shown in FIG. 7, multi-model ML architecture selection scheme 700 may include determining a list and/or a description of compute resources 706 at the edge device, for example, based on the identified available computing resources of the edge device, e.g., as described below.

Figure 8:
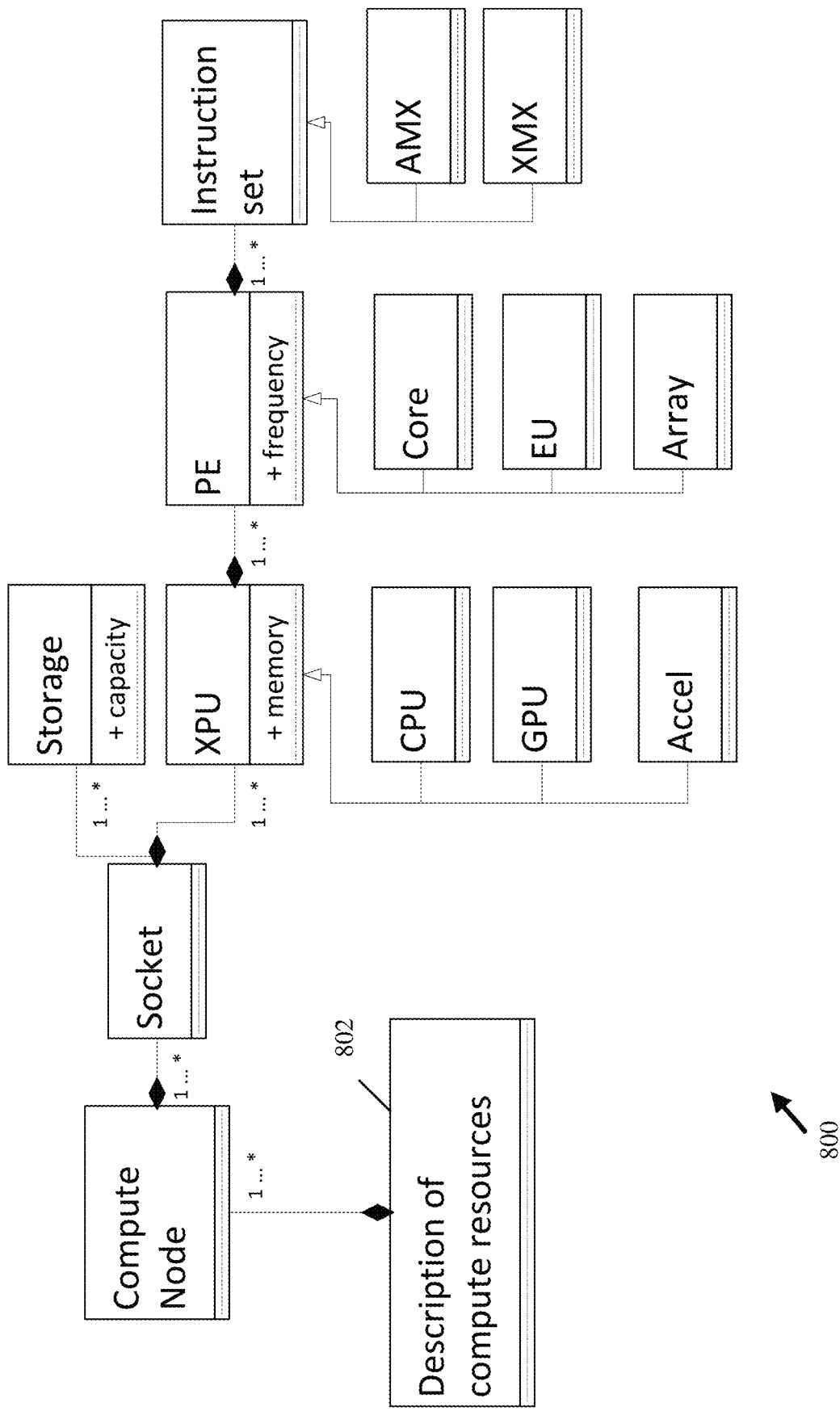
FIG. 8 is a schematic illustration of a description scheme to describe available computing resources of a computing device, in accordance with some demonstrative aspects.

Reference is made to FIG. 8, which schematically illustrates a description scheme 800 to describe available computing resources of a computing device, in accordance with some demonstrative aspects.

In some demonstrative aspects, as shown in FIG. 8, scheme 800 may be configured to provide a description of compute resources 802 of a compute device, e.g., edge device 140 (FIG. 1) and/or edge server 170 (FIG. 1).

In some demonstrative aspects, as shown in FIG. 8, scheme 800 may describe the available resources of the compute device with respect to one or more types of resources, for example, compute resources, memory resources, or the like.

In some demonstrative aspects, scheme 800 may be utilized to identify, which safety architectures may be selected based on available platform resources at the edge servers and/or the edge device.

In some demonstrative aspects, scheme 800 may be generated based on one or more sources of information, for example, existing HW/SW, APIs and/or manual specification.

In some demonstrative aspects, the description of compute resources 802 may include, for example, available resources corresponding to the one or more blocks of FIG. 8, for example, in terms of amount, type, or the like.

Referring back to FIG. 7, in some demonstrative aspects, as indicated at block 708, multi-model ML architecture selection scheme 700 may include identifying available functions for safety architectures.

In some demonstrative aspects, as shown in FIG. 7, the available functions for safety architectures may be identified, for example, based on one or more required functions 732 corresponding to a plurality of multi-model ML architectures 734.

In some demonstrative aspects, as shown in FIG. 7, multi-model ML architecture selection scheme 700 may include determining a list and/or information of exiting functions 710, e.g., in the edge server and/or the edge device, for example, based on the identified available functions, e.g., as described below.

In some demonstrative aspects, construction of some multi-model ML architectures may require the existence of one or more certain functional components.

In one example, a library of pre-defined functions may be used, for example, by a system developer e.g., as follows:

TABLE 1

| Available functions |
| --- |
| Voter SW function |
| Switch SW function |
| Channel acceptance test SW function |
| Fault detector function |
| Watchdog function |

In another example, any other additional and/or alternative functions may be used.

In some demonstrative aspects, the library of pre-defined functions may be extended, for example, by providing 3rd party functions, e.g., to create customized safety architectures.

In some demonstrative aspects, a function may define an interface, for example, to enable a use of multiple implementations provided out-of-the-box and/or 3rd party libraries. For example, the interface may be defined following a component-based design approach and/or any other approach.

In some demonstrative aspects, the interface may be available in a database.

In some demonstrative aspects, a function interface of a function may define the some or all of following information:

TABLE 2

| Interface id |
| --- |
| inputs (name, type, default, description) |
| outputs (name, type, description) |

In other aspect, the function interface may define any other additional and/or alternative information.

In some demonstrative aspects, the function interface may include one or more components, e.g., some or all of following components:

TABLE 3

A reference to the id of the interface implemented
An actual implementation of the interface (code/container)

In other aspects, the function interface may include any other additional and/or alternative components.

In some demonstrative aspects, an implementation of the function interface for an edge server, e.g., edge server 470 (FIG. 4), may be based on Kubeflow framework, and/or any other frame work.

In one example, the Kubeflow framework may be used to orchestrate a ML workload. For example, a task, e.g., a function, may be implemented as a Kubeflow component, which may be embedded into a pipeline to create a complete flow, e.g., a safety architecture.

In one example, the Kubeflow component specification may be used, for example, to identify if a provided function implementing the required interfaces exists or has been provided. For example, input and/or output definitions of the component may be required to match the function interface definition. For example, metadata annotations may be used, e.g., to efficiently identify if a component provides an interface implementation.

In one example, a Kubeflow component for a Majority Voter architecture implementing a "Voting function" interface may be defined, e.g., as follows:

```
name:_Majority voter
description:_Returns the output that has been produced by the majority of the
inputs
metadata:
  annotations:
  interface_implemented: Voter function
inputs:
  - {name: Inputs, type: list(Integer), default: 'None', description:
    'Channel inputs'}
outputs:
- {name: Output vote, type: Integer, description:_'Majority vote'}
implementation:
  container:
  image:_intel-robotics/server-ml-pipeline/docker_image@sha256:a4a54d19
  command: 1
  /ml/vote.py,
  --inputs_of_voter, {inputPath: Inputs},
  --output_of_voter, {outputPath: Output vote},
  ]
```

In other aspects, any other interface may be implemented.

In some demonstrative aspects, an implementation of a function interface for an edge device may be based, for example, on an Interface Definition Language (IDL), and/or any other method.

For example, the IDL may be used to describe the interfaces and/or functions and their implementations.

In one example, a Robot Operating System (ROS) Service Description Specification may be used to specify required inputs and/or provided outputs of a function.

For example, a fail-degraded workload function at the edge device may be defined, e.g., as follows:

```
#Service description specification of "Fail-degraded classification channel"
#request
uint32[ ] sensor_data
---
#response
uint32 classification_result
```

In other aspects, any other additional or alternative function implementations and/or approaches may be used.

Referring to FIG. 7, in some demonstrative aspects, as indicated at block 712, multi-model ML architecture selection scheme 700 may include selecting target hazards, for example, from a plurality of hazards in a hazard database 711.

In some demonstrative aspects, as shown in FIG. 7, selecting the target hazards may be based on a policy and/or an input from a user.

In one example, selection of the target hazards to address may be controlled directly by a human and/or through an automated policy.

In some demonstrative aspects, a set of hazards including a plurality of hazards may be stored in database 711, e.g., an extensible database and/or any other type of database or storage.

In some demonstrative aspects, the set of hazards may be defined by a category structure, a human-readable description, and/or a unique identification (ID) per hazard, e.g., as follows:

TABLE 4

| Hazard category | Hazard subcategory | id # |
|---|---|---|
| Identify training data and modeling problems | Unbalanced training (e.g., underrepresentation of classes) | 1 |
| | Insufficient training (e.g., not covered edge case) | 2 |
| Identify adversarial attacks | Imperceptible image alterations | 3 |
| Identify tooling problems | Systematic errors (buggy development software chains) | 4 |
| Identify platform faults | Production problems (random permanent faults) | 5 |
| | Design problems (systematic permanent faults) | 6 |
| | Aging problems (increasing transient errors) | 7 |
| | Workload isolation problems (timing problems) | 8 |
| Identify context problems | Out of ODD deployment, unexpected noise levels | 9 |

In other aspects, the set of hazards may be defined by any other additional and/or alternative categories, information, and/or parameters.

In some demonstrative aspects, as shown in FIG. 7, selecting the target hazards may result in a selected target hazard 714. In one example, the selected target the selected target hazard may include a target hazard from Table 4, e.g., the design problems having the ID 6 and/or any other target hazard.

In one example, the selected safety architecture may be configured to mitigate the selected target hazard 714.

In some demonstrative aspects, as indicated at block 716, multi-model ML architecture selection scheme 700 may include selecting one or more appropriate proxy metrics, for example, based on the selected target hazard 714.

In some demonstrative aspects, the performance metrics may include one or more algorithmic metrics 719.

In some demonstrative aspects, a set of pre-identified algorithmic metrics, which may be used for detection of particular hazards, may be mapped, for example, to the plurality of hazards, e.g., as follows:

TABLE 5

| Metric class | Metric | Variants | Useful for hazard id |
|---|---|---|---|
| Epistemic uncertainty | Inter-model uncertainty | Output-based Evidence-based | 1, 2, 9 |
| | Intra-model uncertainty | Output-based Evidence-based | 1, 2, 9 |
| Aleatory uncertainty | Noise robustness | Output-based Evidence-based | 3, 7 |
| Consistency (within redundant executions [replication/ diversification]) | Consistency on homogeneous platform | Output-based Evidence-based | 5 |
| | Consistency on heterogeneous platform | Output-based Evidence-based | 6 |
| | Consistency on heterogeneous tool flow | Output-based Evidence-based | 4 |
| Timing | Timeout | | 8 |

In other aspects, any other additional and/or alternative metrics may be implemented.

In some demonstrative aspects, the pre-identified metrics may be stored in a data base, e.g., database 711.

In some demonstrative aspects, Table 5 may be queried, e.g., by ML architecture processor 124 (FIG. 1), to identify which algorithmic metrics to prioritize in an ensemble creation, for example, based on the target hazards 714.

In some demonstrative aspects, an epistemic (model) uncertainty metric class may enable an assessment of a confidence (or lack of confidence) of a model output of an ML model related to internal knowledge of the ML model.

In some demonstrative aspects, inter-model uncertainty may consider the disagreement between multiple models performing the same task, e.g., ensemble members.

In some demonstrative aspects, intra-model uncertainty may consider a disagreement of a single model, e.g., when the internal structure is randomly pruned during inference.

In some demonstrative aspects, the model uncertainty estimation may be computed from a model output, e.g., how much the model output varies between models. For example, if a model is sub-optimally trained, e.g., if a class is underrepresented, model uncertainty estimation may detect it via an observed higher disagreement in the model outputs compared to well-represented samples, for example, as not enough redundancies would have been captured.

In some demonstrative aspects, an aleatory uncertainty metric class may be related to the randomness of the input data, e.g., such as noise. For example, this metric may be estimated through propagation of noise through a network, and/or through replacement of network activation scalar values to probability distributions.

In some demonstrative aspects, a consistency metric class may be based on multiple execution of a model under different circumstances, which may reveal systematic problems in a tool flow, a platform design, and/or random permanent faults.

In one example, resources of a platform may be varied, e.g., by selectively choosing diverse operations, or IP blocks to test systematic problems at early stages of a system life cycle.

In one example, algorithmic performance metrics, e.g., accuracy, may play a role, for example, when exploring an ensemble design space, e.g., as described below.

In some demonstrative aspects, multi-model ML architecture selection scheme 700 may be based on one or more attribution-based diversity metrics, e.g., as described below.

In some demonstrative aspects, the attribution-based diversity metrics may be configured to measure a diversity of a model based on computation of most important inputs attributing to the model decision, for example, based on attribution maps and/or any other attribution information. Accordingly, attribution-based diversity metrics may be different from other metrics, which measure a diversity of a model based on output differences of the model.

In some demonstrative aspects, the attribution maps may be computed, for example, based on gradient-based techniques, integrated gradients techniques, Gradient-weighted Class Activation Mapping (Grad-CAM) techniques, model agnostic approaches, and/or any other additional and/or alternative techniques.

In some demonstrative aspects, the attribution-based diversity metrics may be implemented to support a technical solution to enable creation of ensembles, which may produce a same output, for example, while operating in a diverse manner, e.g., based on different inputs attributing to the output. For example, the attribution-based diversity metrics may be implemented to support a technical solution to avoid trading off accuracy or other performance metrics, while still providing a measure of uncertainty.

Figure 9:
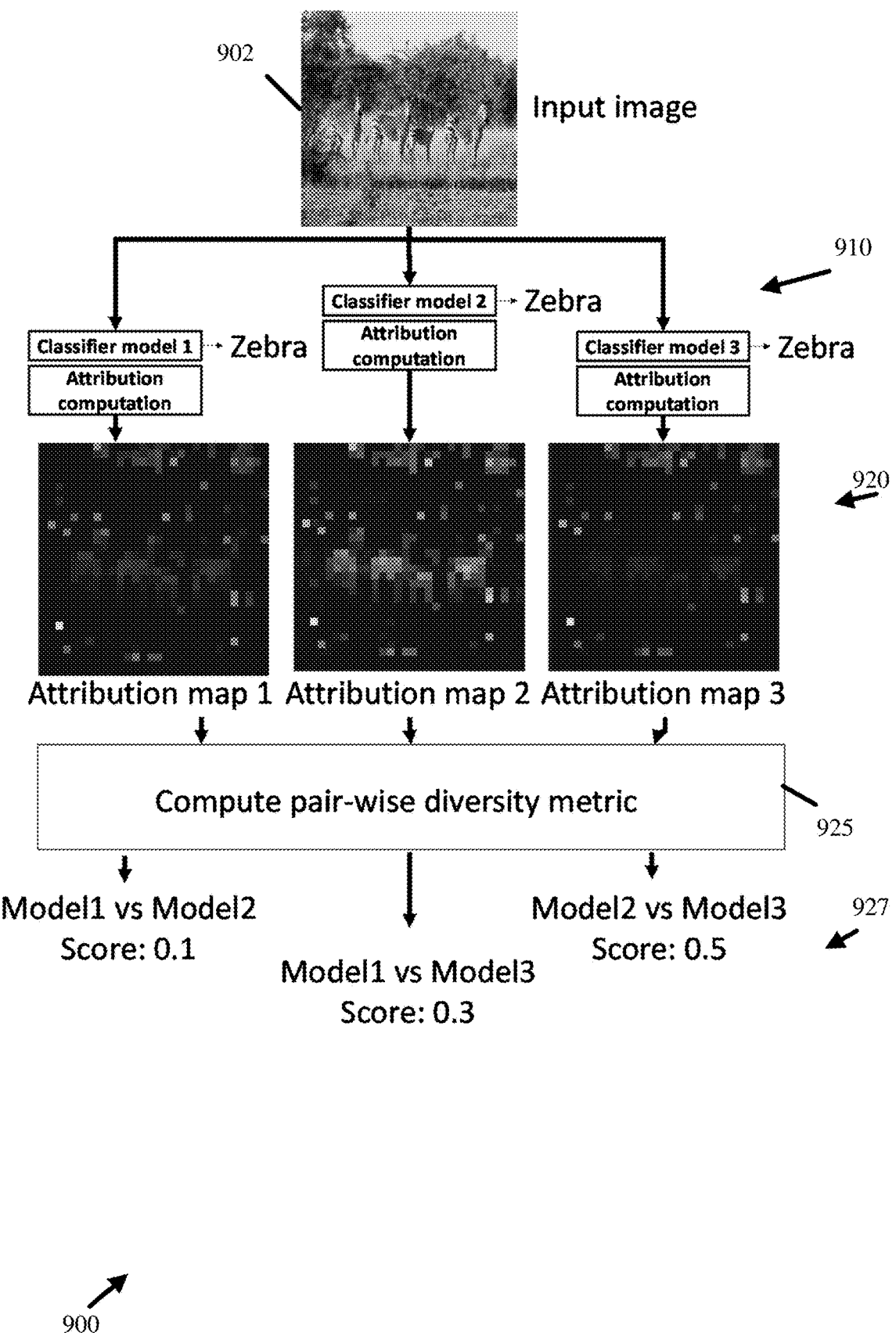
FIG. 9 is a schematic illustration of a scheme to determine an attribution-based diversity metric, in accordance with some demonstrative aspects.

Reference is made to FIG. 9, which schematically a scheme 900 to determine an attribution-based diversity metric, in accordance with some demonstrative aspects. For example, a ML architecture processor, e.g., ML architecture processor 124 (FIG. 1) may be configured to utilize one or more operations of the scheme 900 to determine one or more attribution-based diversity metrics.

In some demonstrative aspects, as shown in FIG. 9, a plurality of ML models 910, e.g., classification models, may process an input image 902, e.g., an image of one or more zebras.

In some demonstrative aspects, as shown in FIG. 9, the plurality of ML models may output a plurality of classification results corresponding to the input image 902, e.g., a zebra, and/or any other classification.

In some demonstrative aspects, as shown in FIG. 9, the scheme 900 may be configured to determine a plurality of attribution maps 920 corresponding to the ML models 910, e.g., an attribution map 920 per an ML model 910. For example, an attribution map 920 corresponding to an ML model 910 may identify which pixels in input image 902 contribute to the classification result of the ML model 910.

In some demonstrative aspects, as shown in FIG. 9, two different ML models 910 may consider different pixels to generate the outputs/classification results.

In some demonstrative aspects, as indicated at block 925, a plurality of attribution-based diversity metric scores 927 may be determined corresponding to a respective plurality of pairs of ML models of ML models 910.

In some demonstrative aspects, an attribution-based diversity metric scores 927 corresponding to a pair of ML models may be determined, for example, based on diversity between the pixels that contribute to the output of each ML model 910 in the pair of ML models.

In one example, an attribution-based diversity metric score between Model2 and Model3, may be 0.5, which may be the highest among other attribution-based diversity metric scores. For example, the diversity between pixels of an attribution map 2 contributing to the output of Model2 and pixels of an attribution map 3 contributing to the output of Model3 may be the highest.

In some demonstrative aspects, as shown in FIG. 9, image 902 may be fed to the ML models 910 for inference.

In some demonstrative aspects, as shown in FIG. 9, an attribution map 920 may be computed for each ML model 910, for example, to identify input pixels that were most important with respect to a model output of the ML model 910, e.g., for the class Zebra.

In some demonstrative aspects, as shown in FIG. 9, the attribution maps 910 may be fed to a diversity evaluator, which may utilize a pair-wise difference and/or any other method, for example, to identify the pairs of ML models that made their decisions based on the most different evidence, e.g., pixels.

In some demonstrative aspects, the attribution-based diversity metric score evaluated according to scheme 900 may be based, for example, on an internal operation of the ML models 910. Accordingly, the attribution-based diversity metric score evaluated according to scheme 900 may be different from an output-based diversity metric, which may provide little information about the internal operation of the ML models, for example, when the outputs of the ML models are similar.

In some demonstrative aspects, the attribution-based diversity metric score evaluated according to scheme 900 may provide information on the internal operation of the ML models 910, for example, even in case where outputs of the ML models 910 are exactly the same.

In some demonstrative aspects, using the attribution-based diversity metrics may provide some semantic insight into the model operation of ML models 910. For example, this insight may be leveraged, for example, to use measures of uncertainty and/or consistency, for example, based on the evidence diversity, for example, instead of output disagreements.

In some demonstrative aspects, one or more ML models, e.g., transformers and/or the like, may include attention layers, which could provide an approximation function of a true attribution map.

In some demonstrative aspects, the attribution-based diversity metric score may be defined for a pair of models, or for an ensemble of N members, e.g., including more than two ML models.

In some demonstrative aspects, the attribution-based diversity metric may be computed as an attribution-based diversity metric score, e.g., a pixel and/or channel-wise score, for attributions, that measures how common/unique is a singular attribution with respect to all other contributions of other ML models.

In some demonstrative aspects, a plurality of attribution-based diversity metric scores may construct a score map or a score metric, which may be used for one or more different purposes. For example, the score map may be averaged in a single entire image, for example, to compare an average diversity between different ensembles.

In some demonstrative aspects, the attribution-based diversity metric may be based on one or more different attribution-based diversity metric attributes, e.g., as follows:

TABLE 6

| Pairwise difference | Pairwise Individual unique. | Ensemble Individual unique evidence | Ensemble Unique positive evidence |
|---|---|---|---|
| A − B | ReLu(A) − ReLu(B) | ∀k: mean(ReLu(A) − ReLu (Bk)) | ∀i, k: mean(\|ReLu(Ai) − ReLu(Ak)\|) | wherein A and B represent an image pixel.

In other aspects, the attribution-based diversity metric may be based on any other additional and/or alternative metrics.

Referring back to FIG. 7, as indicated at block 718, multi-model ML architecture selection scheme 700 may include selecting a multi-model ML architecture, e.g., a safety architecture.

In some demonstrative aspects, as shown in FIG. 7, the multi-model ML architecture may be selected, for example, based on the selected algorithmic/proxy metrics 719, the description 706 of compute resources at the edge device, the description 704 of compute resources at the edge server, the plurality of existing functions 710, the attribution-based diversity metric, and/or any other additional or alternative criteria.

In some demonstrative aspects, a selected safety architecture 730 may be selected, for example, from a plurality of predefined safety architectures, e.g., a plurality of multi-model ML architectures, which may be stored in a database.

In some demonstrative aspects, the plurality of multi-model ML architectures may include one or more of the following functions:

TABLE 7

| Safety architecture | Required functions |
|---|---|
| M-out-of-n | Voter, Channels: {N Primary} |
| Heterogeneous duplex pattern | Fault detector, Switch, Channels: {2 Primary} |
| Recovery block | Acceptance test, Channels: {N Primary} |
| Monitor actuator | Channels: {1 Primary, 1 Monitor, 1 Fail-safe} |
| Safety executive | Watchdog, Safety executive, Switch, Channels: {1 Primary, 1 Fail-safe} |

In some demonstrative aspects, the plurality of multi-model ML architectures may utilize any other additional and/or alternative functions.

Figure 10:
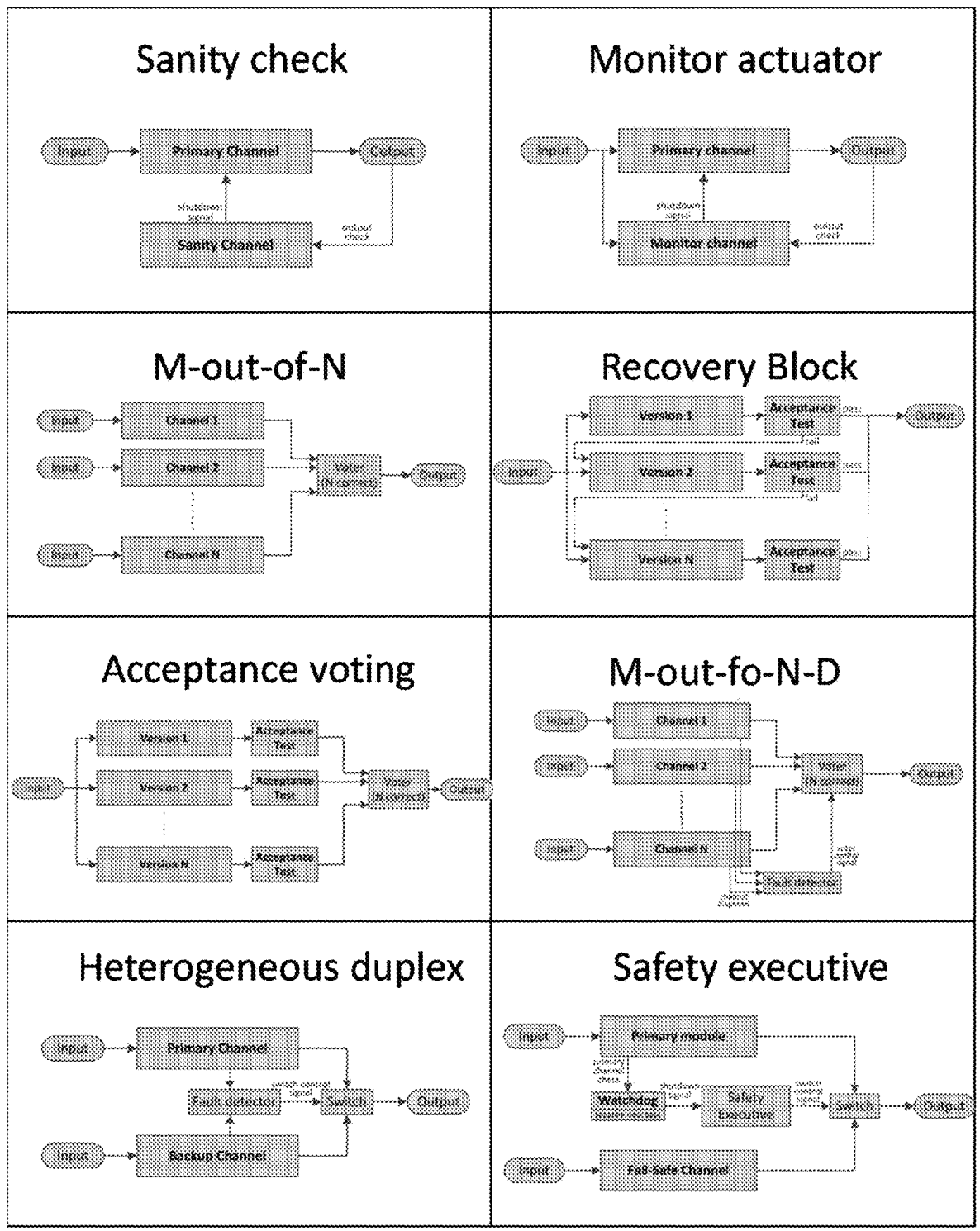
FIG. 10 is a schematic illustration of a plurality of multi-model ML architectures, which may be implemented in accordance with some demonstrative aspects.

Reference is made to FIG. 10, which schematically illustrates a plurality of multi-model ML architectures 1000, which may be implemented in accordance with some demonstrative aspects.

In some demonstrative aspects, a ML architecture processor, e.g., ML architecture processor 124 (FIG. 1) may select a selected safety architecture from the safety architectures 1000, for example, according to multi-model ML architecture selection scheme 700 (FIG. 7). In other aspects, any other additional or alternative safety architectures may be utilized.

In some demonstrative aspects, a safety architecture template corresponding to a safety architecture may define one or more parameters, elements, components and/or interconnections with respect to the safety architecture, e.g., as follows:

TABLE 8

| Elements | parameters | Parameters |
| --- | --- | --- |
| Components | Reference to a required function | Reference to a channel instance |
| Interconnections | Input dependencies (ref by id) | Output dependencies (ref by id) |

In other aspects, any other safety architecture template may be implemented.

In one example, one or more of the plurality of safety architectures 1000, e.g., each one of the plurality of safety architectures 1000, may be configured to provide to the edge device, e.g., device 440 (FIG. 4), a fail-safe or a fail-degraded channel without exception.

In some demonstrative aspects, the plurality of safety architectures, e.g., in Table 8, may be extended to include safety architectures, which may address other additional or alternative KPIs, e.g., to increase accuracy and/or security.

In one example, one or more of the following safety architectures may be utilized:

TABLE 9

| Architecture | Required functions |
| --- | --- |
| Linear combination | Importance weight, Adder, Channels: {N Primary} |
| Uncertainty estimation | Uncertainty estimator, Channels: {N Primary} |

In other aspects, any other additional and/or alternative safety architectures may be used.

In some demonstrative aspects, a ML architecture processor, e.g., ML architecture processor 124 (FIG. 1), may be configured to select the multi-model ML architecture, for example, based on available safety architectures, e.g., in the database; the availability of the required functions 710, the available computational resources 704 and/or 706, the target hazard 714, the selected proxy/algorithmic metric 719, and/or any other additional or alternative criteria.

In some demonstrative aspects, the selection of the multi-model ML architecture may eliminate unviable options, e.g., due to lack of resources of functions.

In some demonstrative aspects, the selection of the multi-model ML architecture may be based on a predefined ranking, which may be static or variable in time.

In one example, a look-up table (LUT) may be implemented to prioritize the safety architecture to choose throughout the entire life cycle of the system, for example, if multiple options are possible. For example, a policy may indicate to prioritize safety architectures, which may be more adequate to hazards of bigger probability, for example, as the life cycle advances, or through monitors indicating specific problems.

Figure 11:
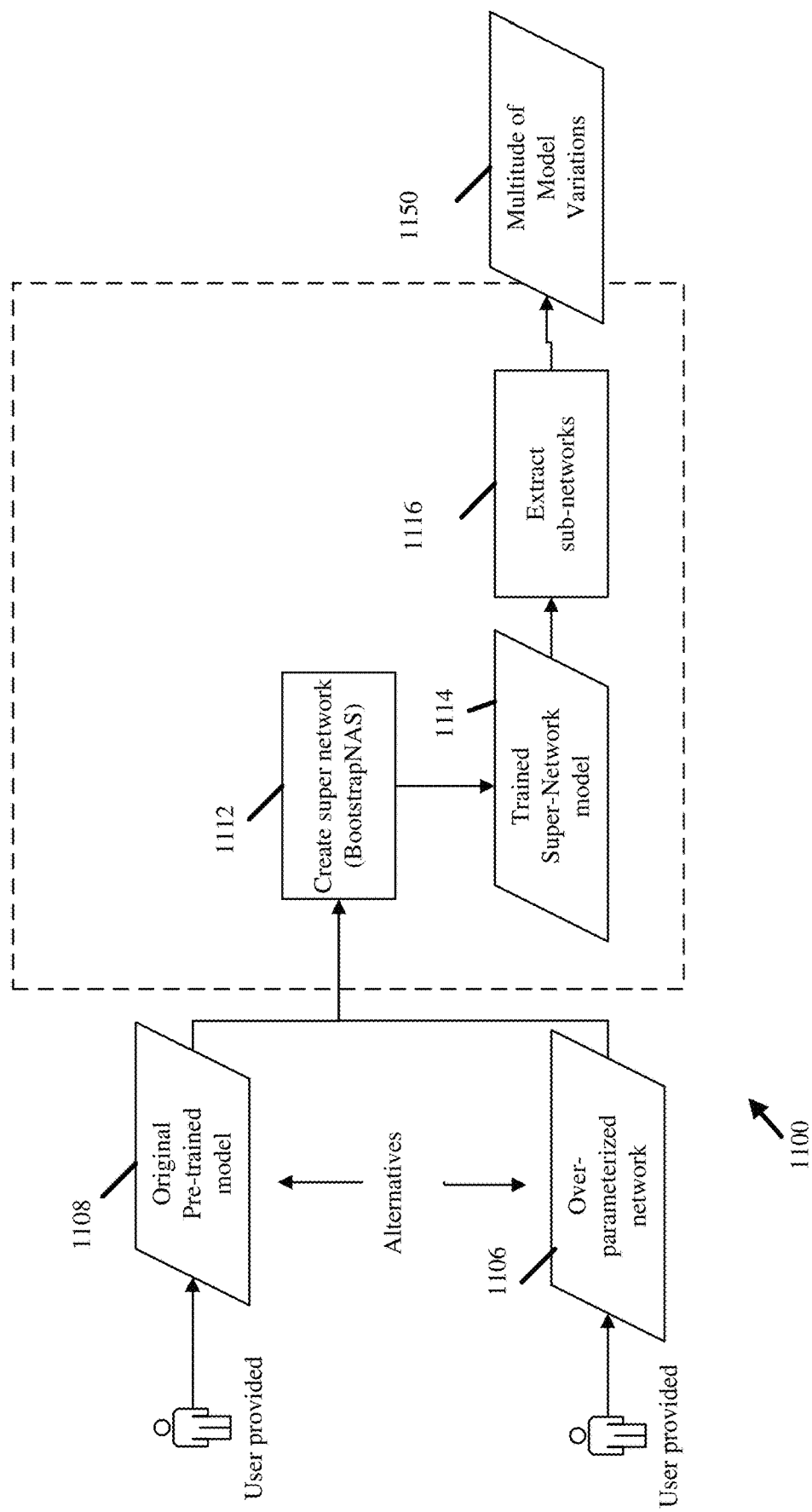
FIG. 11 is a schematic illustration of a scheme to derive ML model derivations, in accordance with some demonstrative aspects.

Reference is made to FIG. 11, which schematically illustrates a scheme a scheme to derive ML model derivations 1100, in accordance with some demonstrative aspects.

In some demonstrative aspects, scheme 1100 may be configured to generate a plurality of derived ML models 1150, e.g., a plurality of ML model variations.

In one example, ML architecture processor 124 (FIG. 1) may be configured to perform one or more operations of scheme 1100, for example, to generate a plurality of derived ML models.

In another example, one or more operations of block 414 (FIG. 4) of ML architecture construction scheme 400 (FIG. 4) may be performed based on one or more operations of scheme 1100.

In some demonstrative aspects, as shown in FIG. 11, scheme 1100 may be configured to process an ML model 1108, e.g., ML model 408 (FIG. 4).

In some demonstrative aspects, as indicated at block 1112, scheme 1100 may include creating a super network 1114, e.g., a trained super network model.

In some demonstrative aspects, as indicated at block 1116, scheme 1100 may include extracting the plurality of derived ML models 1150, e.g., sub models, from the trained super network model 1114. In one example, the plurality of derived ML models 1150 may be extracted without retraining.

In some demonstrative aspects, scheme 1100 may be based on a one-shot, weight-sharing NAS, e.g., a Bootstrap NAS, for example, to generate a big number of the plurality of derived ML models 1150, for example, without the need to retrain them.

In some demonstrative aspects, a bootstrap NAS and/or any other technique may be used to convert the pre-trained model 1108 into the super network 1114, e.g., a One-Shot NAS super-network.

In other aspects, any other technique may be utilized to generate the trained super network model 1114.

In some demonstrative aspects, super network 1114 may include an over-parameterized super-network.

In some demonstrative aspects, an over-parameterized super-network may explore training models with greater capacity, for example, to improve a result of the ML model derivations generation scheme 1100.

In some demonstrative aspects, as shown in FIG. 11, scheme 1100 may be configured to process one or more alternatives to ML model 1108.

In some demonstrative aspects, as shown in FIG. 11, scheme 1100 may be configured to process an over parametrized network 1106, e.g., to create an over-parameterized super-network.

In some demonstrative aspects, one or more optimization methods, e.g., a progressive shrinking method, and/or any other super-network training algorithms, may be used to optimize the super network 1110.

In some demonstrative aspects, the over-parameterized super-network 1106 may be generated from one or more proven models, e.g., having an outstanding performance in a particular domain, e.g., image classification and/or any other domain.

In some demonstrative aspects, the over-parameterized super-network 1106 may be based on one or more architectures, e.g., a Mobilenet-V3 architecture, or the like.

In some demonstrative aspects, the over-parameterized super-network 1106 may be determined by increasing a depth, a width, and/or kernel sizes of the ML model 1108.

In some demonstrative aspects, scheme 1100 may be configured to process a custom pre-trained model.

In some demonstrative aspects, the custom pre-trained model may be used for generating the super-network 1114.

In some demonstrative aspects, super network 1114 may be determine, e.g., based on the NAS technique or any other technique, for example, with any of the options described above, e.g., the custom pre-trained model, the over-parameterized super-network 1106, and/or the ML model 1108.

In some demonstrative aspects, the plurality of derived ML models 1150 may include many sub-models, e.g., hundreds or even thousands of ML-model variations, which may be efficiently extracted and fed to a next step, e.g., at block 416 (FIG. 4) of ML architecture construction scheme 400 (FIG. 4), for example, to select one or more best candidates.

Figure 12:
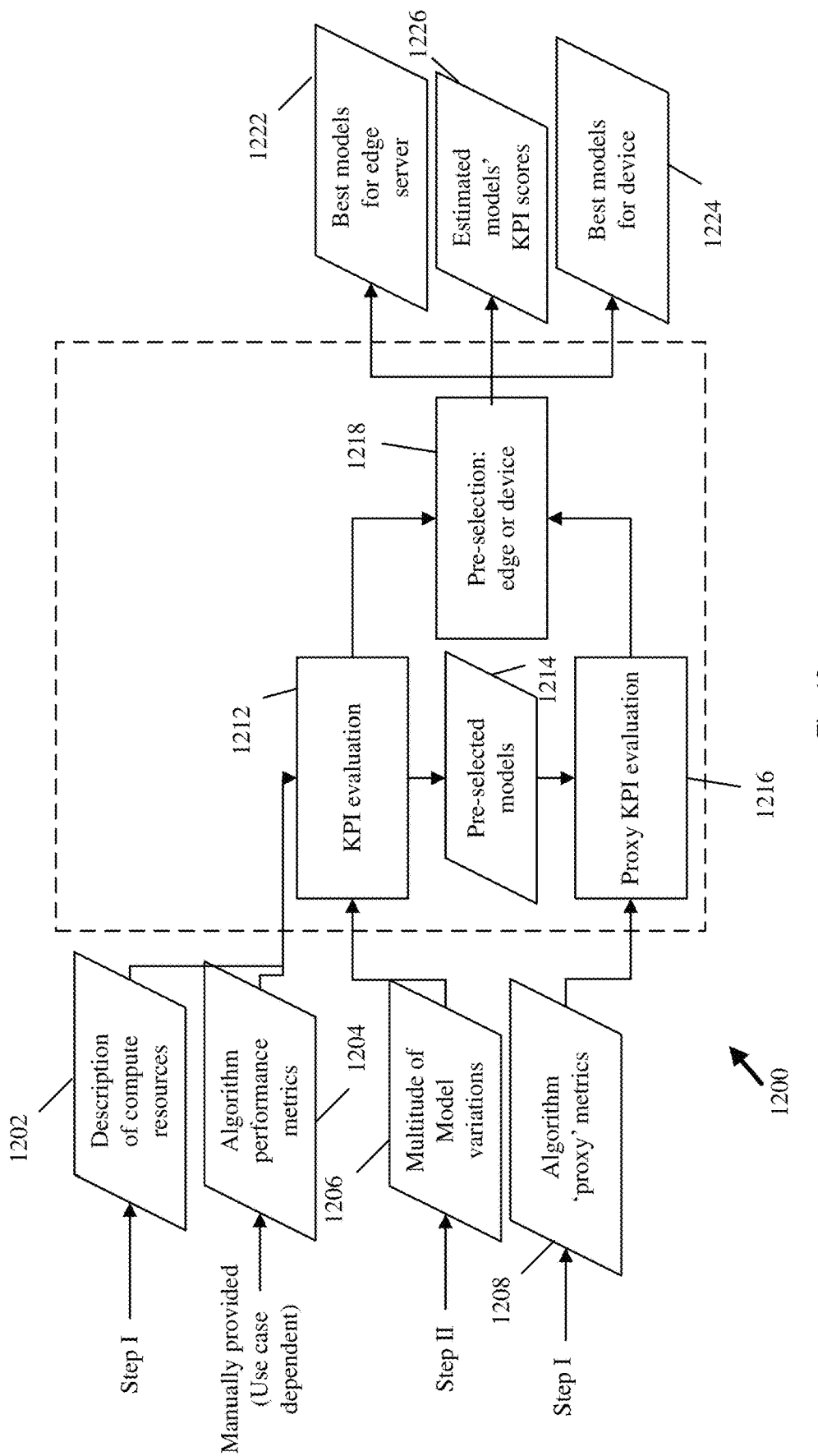
FIG. 12 is a schematic illustration of a model selection scheme to select a plurality of ML model candidates, in accordance with some demonstrative aspects.

Reference is made to FIG. 12, which schematically illustrates a model selection scheme 1200 to select a plurality of ML model candidates, in accordance with some demonstrative aspects.

In one example, ML architecture processor 124 (FIG. 1) may be configured to perform one or more operations of model selection scheme 1200, for example, to select a plurality of ML model candidates.

In another example, one or more operations of block 416 (FIG. 4) of ML architecture construction scheme 400 (FIG. 4) may be based on one or more operations of model selection scheme 1200.

In some demonstrative aspects, as shown in FIG. 12, model selection scheme 1200 may be configured to process a description of computing resources 1202, e.g., including the description 706 (FIG. 7) of compute resources at the edge device, and/or the description 704 (FIG. 7) of compute resources at the edge server.

In some demonstrative aspects, as shown in FIG. 12, model selection scheme 1200 may be configured to process one or more algorithm performance metrics 1204, e.g., including the description 706 (FIG. 7) of compute resources at the edge device, and/or the description of compute resources at the edge server 704 (FIG. 7).

In some demonstrative aspects, as shown in FIG. 12, model selection scheme 1200 may be configured to process a plurality of ML model derivations 1206, e.g., including the plurality of ML model derivations 1150 (FIG. 11).

In some demonstrative aspects, as shown in FIG. 12, model selection scheme 1200 may be configured to process one or more proxy metrics 1208, e.g., including the one or more proxy/algorithmic metrics 719 (FIG. 7).

In some demonstrative aspects, as indicated at block 1212, model selection scheme 1200 may include evaluating one or more KPIs corresponding to the plurality of ML model derivations 1206, for example, based on the one or more algorithm performance metrics 1204 and/or the description of computing resources 1202.

In some demonstrative aspects, as shown in FIG. 12, a plurality of pre-selected ML models 1214 may be determined based on evaluating the one or more KPIs of the plurality of ML model derivations 1206.

In some demonstrative aspects, as indicated at block 1216, model selection scheme 1200 may include evaluating one or more proxy KPIs of the plurality of pre-selected ML models 1214, for example, based on the one or more proxy metrics 1208.

In some demonstrative aspects, as indicated at block 1218, model selection scheme 1200 may include determining which one or more first pre-selected ML models 1222 may be executed on a server device, e.g., edge server 470 (FIG. 4), and/or which one or more second pre-selected ML models 1224 may be executed on an edge device, e.g., edge server 470 (FIG. 4). For example, the one or more first pre-selected ML models and/or the one or more second pre-selected ML models may be determined, for example, based on one or more proxy KPIs 1208 corresponding to the plurality of pre-selected ML models 1214, and/or the performance KPIs 1204 corresponding to the plurality of pre-selected ML models 1214.

In some demonstrative aspects, as shown in FIG. 12, a plurality of KPI scores 1226 may be determined corresponding to the ML models variants 1222 and/or the ML models variants 1224.

In one example, ML model variants 1222 and/or 1224 may be selected from the automatically generated model variations, e.g., potentially thousands of model variations, according to one or more KPIs. For example, the one or more KPIs may include KPIs related to algorithmic performance, with the one or more proxy metric KPIs.

In some demonstrative aspects, as shown in FIG. 12, selection scheme 1200 may include selecting ML models for two different categories. For example, selection scheme 1200 may select ML model variants for the edge servers, e.g., ML models variants 1222, for example, the ensemble members; and/or ML model variants for the edge device, e.g., e.g., ML models variants 1222, for example, for a fail-degraded, and/or a fail-safe channel.

In some demonstrative aspects, one or more criteria for selection of ML models variants 1222 and/or 1224 may be based, for example, on an architecture complexity, which may be defined based on one or more available compute resources.

In one example, the architecture complexity may include, for example, number of MAC operations, e.g., required for an ML model.

In another example, the architecture complexity may include, for example, parameter size constraints of a size of an ML model.

In another example, the architecture complexity may include, for example, operation complexity constraints corresponding to execution of an ML model.

In another example, the architecture complexity may include, for example, operator primitives constraints corresponding to the operator primitives constraints of an ML model.

In another example, the architecture complexity may include, for example, depth, and/or width constraints corresponding to a width and/or a depth of an ML model.

In another example, the architecture complexity may include any other additional and/or alternative constrains and/or parameters.

In some demonstrative aspects, one or more criteria for selection of ML models variants 1222 and/or 1224 may be based, for example, on one or more algorithmic KPIs, which may be defined, for example, by a use case application. For example, the one or more algorithmic KPIs may include accuracy, latency, and/or any other KPIs.

In some demonstrative aspects, one or more criteria for selection of ML models variants 1222 and/or 1224 may be based, for example, on the proxy metrics, which may be defined by the targeted hazards. For example, the proxy metrics may include the attribution-based diversity metric, the uncertainty metric, the consistency metric, and/or any other additional or alternative metric.

In some demonstrative aspects, an API of the NAS mechanism may be used to evaluate an algorithm performance metric, e.g., accuracy, latency and/or the like, of a reduced set of sub-ML models, which may meet size constraints imposed by the available resources.

In some demonstrative aspects, the evaluation of the algorithm performance metrics 1204 may be hardware-aware, for example, as measurements of certain objectives, e.g., latency, may occur in a particular device, e.g., at an edge server.

In some demonstrative aspects, the proxy metrics 1208 may be evaluated for subsets of the sub-models (subnetworks), which may meet the specified size constraints.

In some demonstrative aspects, these evaluators may be incorporated in a search API to seek a set of solutions, e.g., Pareto-optimal solutions, for example, a Pareto-front solution.

In some demonstrative aspects, ML model variants 1222 and/or 1224 may be provided to a next step, for example, to be used for construction of the multi-model ML architecture, e.g., at block 418 (FIG. 4) of ML architecture construction scheme 400 (FIG. 4).

In some demonstrative aspects, the estimated KPI scores 1226 may be provided for one or more ML models, e.g., for each ML model, for example, to enable an estimation of a final ensemble in the selected safety architecture.

Figure 13:
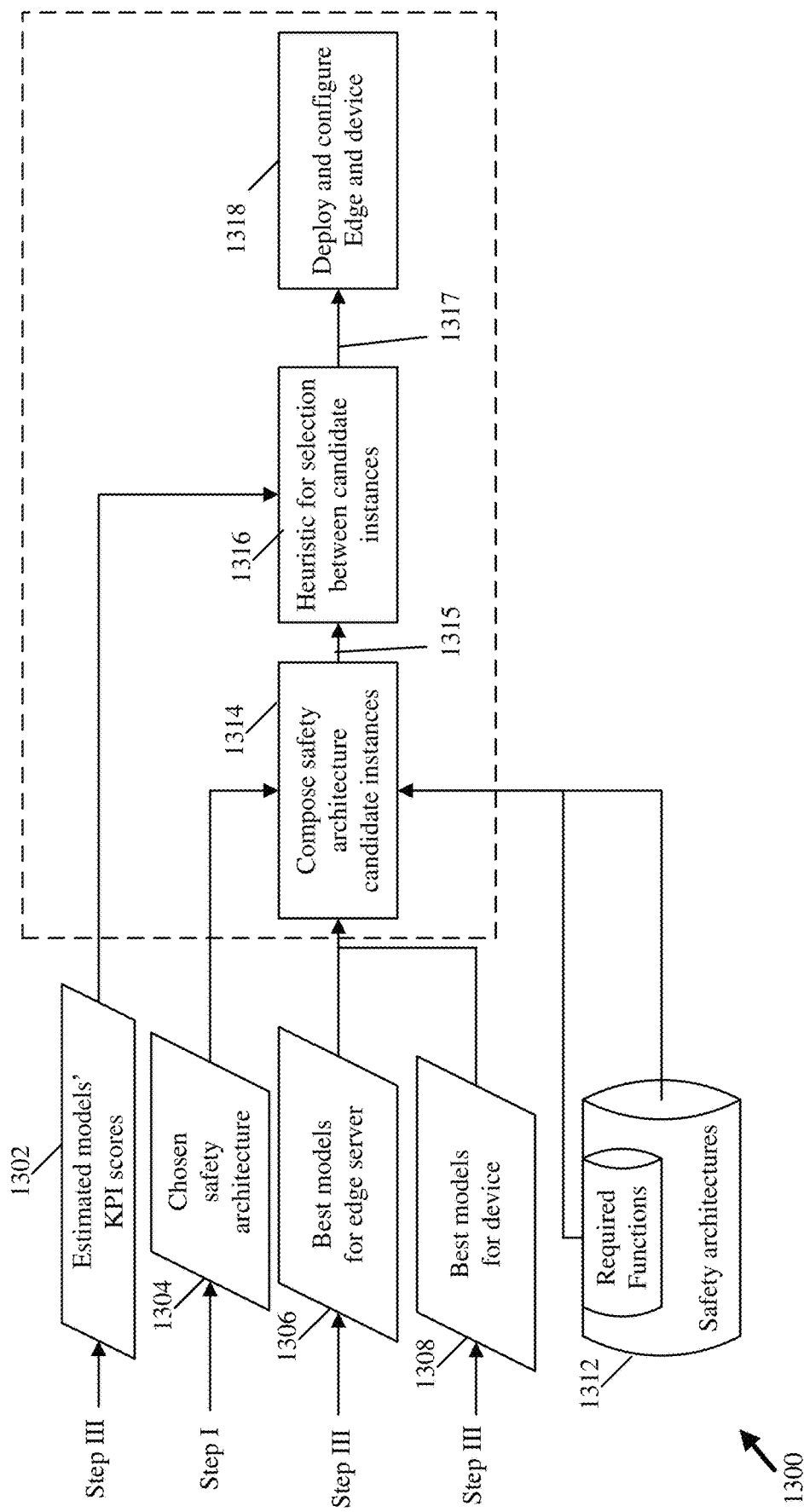
FIG. 13 is a schematic illustration of a construction scheme to construct a multi-model ML architecture, in accordance with some demonstrative aspects.

Reference is made to FIG. 13, which schematically illustrates a construction scheme 1300 to construct a multi-model ML architecture, in accordance with some demonstrative aspects.

In some demonstrative aspects, construction scheme 1300 may include one or more operations, for example, to construct the multi-model ML architecture, e.g., as described below.

In some demonstrative aspects, a computing device, e.g., computing device 102 (FIG. 1), may be configured to perform one or more operations of construction scheme 1300.

In one example, ML architecture processor 124 (FIG. 1) may perform one or more operations of construction scheme 1300, for example, to construct the multi-model ML architecture.

In another example, one or more operations of block 418 (FIG. 4) of ML architecture construction scheme 400 (FIG. 4) may be performed based on one or more operations of construction scheme 1300.

In some demonstrative aspects, as shown in FIG. 13, construction scheme 1300 may be configured to process performance scores 1302 of the ML model, e.g., including performance scores 1226 (FIG. 12).

In some demonstrative aspects, as shown in FIG. 13, construction scheme 1300 may be configured to process a selected multi-model ML architecture 1304, e.g., the selected multi-model ML architecture 730 (FIG. 7).

In some demonstrative aspects, as shown in FIG. 13, construction scheme 1300 may be configured to process one or more ML models 1306 for an edge server, e.g., the ML model variants 1222 (FIG. 12) to be executed on the server device.

In some demonstrative aspects, as shown in FIG. 13, construction scheme 1300 may be configured to process one or more ML models 1308 for an edge device, e.g., the ML model variants 1224 (FIG. 12) to be executed on the edge device.

In some demonstrative aspects, as shown in FIG. 13, construction scheme 1300 may be configured to process safety architecture information corresponding to the multi-model ML architecture, for example, based on information in a database 1312 including a plurality of the selected multi-model ML architectures, e.g., database 734 (FIG. 7).

In some demonstrative aspects, as indicated at block 1314, construction scheme 1300 may include constructing a plurality of multi-model architecture instances 1315 of the selected multi-model ML architecture.

In some demonstrative aspects, as indicated at block 1316, construction scheme 1300 may include selecting between the plurality of multi-model architecture instances 1315, for example, based on one or more heuristics.

In some demonstrative aspects, as indicated at block 1318, construction scheme 1300 may include deploying and configuring the edge server and/or the edge device, for example, based on a selected instance 1317 of the plurality of multi-model architecture instances 1315.

In some demonstrative aspects, the multi-model architecture instances 1315 may be instantiated, for example, by logically composing various combinations of the best models obtained and available functions, for example, into the safety architecture template, e.g., one or more of the safety architecture templates of Table 7.

In some demonstrative aspects, the estimated KPI scores 1302 may be used in a heuristic model, for example, to determine a combination of ML models in a particular safety architecture, for example, to balance a trade-off between the performance metrics and the proxy metrics, e.g., to enhance dependability.

In some demonstrative aspects, an estimated KPI score 1302, e.g., each estimated KPI score 1302, may be estimated again on a safety architecture instance 1315, e.g., on each safety architecture instance 1315, for example, by combining the individual KPIs according to the chosen template of the multi model ML architecture.

In some demonstrative aspects, the heuristic model may be configured to determine the selected instance 1317, e.g., by determining which non-dominated solution to the multi-objective problem is to be used, for example, according to a Pareto-front of candidate template instances.

In one example, a selection, e.g., every selection, from the plurality of instances 1315 may represent a tradeoff between the selected KPIs in a Pareto front.

For example, if the selected multi-model ML architecture is a simple linear combination of ensemble members, then the heuristic may first evaluate the final ensemble performance in the selected architecture, and then the heuristic may select an ensemble where the objective estimations are balanced, e.g., using an L1 norm on all estimated KPIs in the ensemble, and/or any other criteria.

Figure 14:
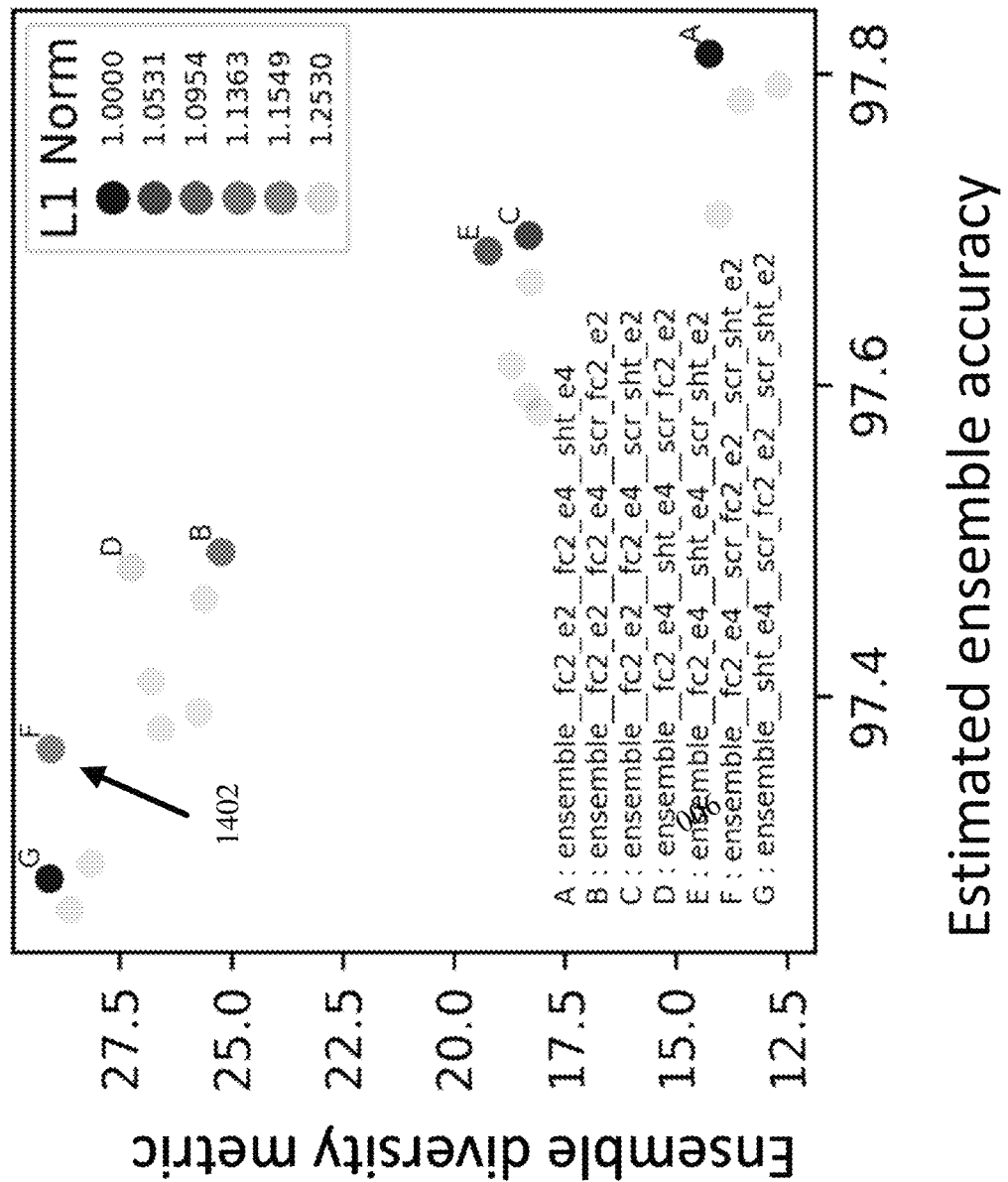
FIG. 14 is a schematic illustration of a Pareto-front graph based on an attribution-based diversity metric, in accordance with some demonstrative aspects.

Reference is made to FIG. 14, which schematically illustrates a Pareto-front graph 1400 based on an attribution-based diversity metric, in accordance with some demonstrative aspects.

In some demonstrative aspects, Pareto-front graph 1400 may be used to determine ensemble members for a multi-model ML architecture including a linear combination.

In some demonstrative aspects, as shown in FIG. 14, Pareto-front graph 1400 depicts ensemble accuracy versus ensemble diversity of a plurality of ensembles.

In some demonstrative aspects, a ML architecture processor, e.g., ML architecture processor 124, may be configured to select an instance 1402 of the multi-model ML architecture, for example, based on a balance between the ensemble accuracy and the ensemble diversity, for example, which may provide both an improved accuracy and an improved diversity.

Referring back to FIG. 4, in some demonstrative aspects, one or more operations and/or functionalities of ML architecture construction scheme 400 may be adapted, for example, to adapt to one or more different hazards, e.g., as described below.

In some demonstrative aspects, one or more operations and/or functionalities of ML architecture construction scheme 400 may be performed during run-time, for example, in addition to or instead of offline, for example, to enable to re-target hazards of interest and/or to accommodate to a change in available resources.

In some demonstrative aspects, the selection of ML Model variants 432 and/or 434 may be re-executed, for example, to adapt to a change in one or more KPI preferences. For example, the selection of ML Model variants 432 and/or 434 may be re-evaluated, for example, to target problems addressed by epistemic uncertainty.

In some demonstrative aspects, the selected multi-model ML architecture may be changed as well, for example, as a result of the target problems addressed by epistemic uncertainty.

In one example, the adaptation and/or reconfiguration of ML architecture construction scheme 400 may be performed without loss of availability, for example, if the device has sufficient compute resources to enable continuous operation of the previous configuration until a new configuration may be set up. Otherwise, a safely planned downtime may be scheduled.

In some demonstrative aspects, the adaptation and/or reconfiguration of ML architecture construction scheme 400 may be triggered an on-demand manual request from a system administrator, an automated policy, and/or any other trigger.

In one example, the automated policy may define a schedule where in a first period, e.g., the first 6 months, the hazards of scope may be related to data and modeling problems, a middle life period may be related to detection of out-of-ODD operation, and/or a last stages period may be related to platform faults due to aging.

In another example, the automated policy may define any other adaptation schedule.

Figure 15:
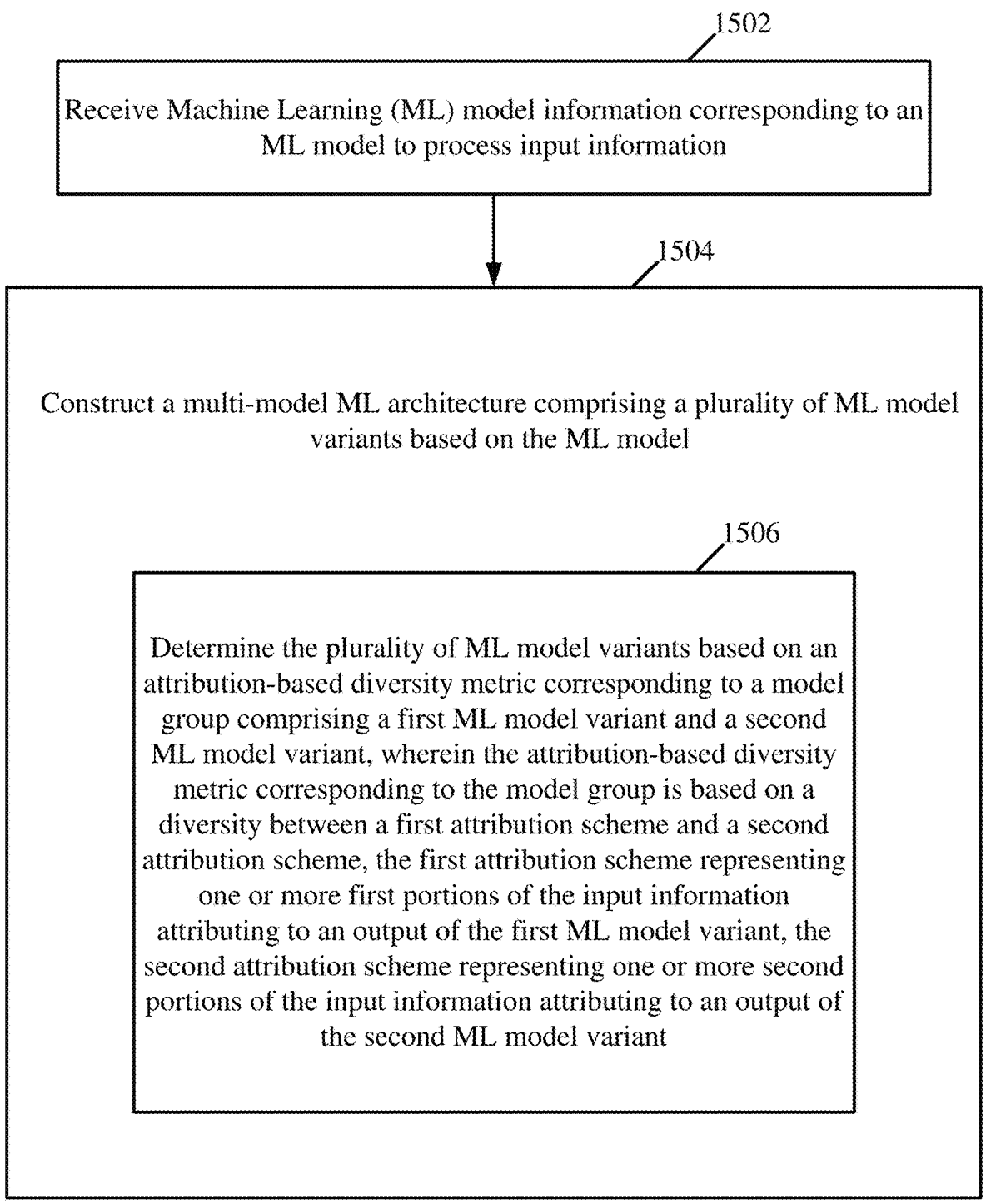
FIG. 15 is a schematic flow-chart illustration of a method of constructing a multi-model ML architecture, in accordance with some demonstrative aspects.

Reference is made to FIG. 15, which schematically illustrates a method of constructing a multi-model ML architecture. For example, one or more of the operations of the method of FIG. 15 may be performed by one or more elements of a system, e.g., system 100 (FIG. 1), for example, one or more devices, e.g., computing device 102 (FIG. 1), a ML architecture processor, e.g., ML architecture processor 124 (FIG. 1), and/or a ML architecture construction scheme, e.g., ML architecture construction scheme 400 (FIG. 4).

As indicated at block 1502, the method may include receiving ML model information corresponding to an ML model to process input information. For example, computing device 102 (FIG. 1) may receive via input 106 (FIG. 1) the ML model information 108 (FIG. 1) corresponding to the ML model to process input information 142 (FIG. 1), e.g., as described above.

As indicated at block 1504, the method may include constructing a multi-model ML architecture comprising a plurality of ML model variants based on the ML model. For example, ML architecture processor 124 (FIG. 1) may be configured to construct the multi-model ML architecture including the plurality of ML model variants based on the ML model, e.g., as described above.

As indicated at block 1506, constructing the multi-model ML architecture may include determining the plurality of ML model variants based on an attribution-based diversity metric corresponding to a model group including a first ML model variant and a second ML model variant, wherein the attribution-based diversity metric corresponding to the model group is based on a diversity between a first attribution scheme and a second attribution scheme, the first attribution scheme representing one or more first portions of the input information attributing to an output of the first ML model variant, the second attribution scheme representing one or more second portions of the input information attributing to an output of the second ML model variant. For example, ML architecture processor 124 (FIG. 1) may determine the plurality of ML model variants based on the attribution-based diversity metric corresponding to the model group, e.g., as described above.

Figure 16:
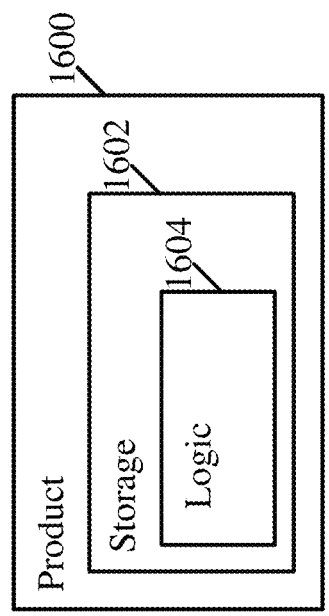
FIG. 16 is a schematic illustration of a product of manufacture, in accordance with some demonstrative aspects.

Reference is made to FIG. 16, which schematically illustrates a product of manufacture 1600, in accordance with some demonstrative aspects. Product 1600 may include one or more tangible computer-readable ("machine-readable") non-transitory storage media 1602, which may include computer-executable instructions, e.g., implemented by logic 1604, operable to, when executed by at least one computer processor, enable the at least one computer processor to implement one or more operations at computing device 102 (FIG. 1), ML architecture processor 124 (FIG. 1), and/or ML architecture construction scheme 400 (FIG. 4); to cause computing device 102 (FIG. 1), ML architecture processor 124 (FIG. 1), and/or ML architecture construction scheme 400 (FIG. 4) to perform, trigger and/or implement one or more operations and/or functionalities; and/or to perform, trigger and/or implement one or more operations and/or functionalities described with reference to the FIGS. 1-16, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1600 and/or machine-readable storage media 1602 may include one or more types of computer-readable storage media capable of storing data, including volatile memory, non-volatile memory, removable or non-removable memory, erasable or non-erasable memory, writeable or re-writeable memory, and the like. For example, machine-readable storage media 1602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

Examples

The following examples pertain to further aspects.

Example 1 includes an apparatus comprising an input to receive Machine Learning (ML) model information corresponding to an ML model to process input information; and a processor configured to construct a multi-model ML architecture comprising a plurality of ML model variants based on the ML model, wherein the processor is configured to determine the plurality of ML model variants based on an attribution-based diversity metric corresponding to a model group comprising a first ML model variant and a second ML model variant, wherein the attribution-based diversity metric corresponding to the model group is based on a diversity between a first attribution scheme and a second attribution scheme, the first attribution scheme representing one or more first portions of the input information attributing to an output of the first ML model variant, the second attribution scheme representing one or more second portions of the input information attributing to an output of the second ML model variant.

Example 2 includes the subject matter of Example 1, and optionally, wherein the processor is configured to determine a plurality of derived ML models based on the ML model, and to select the plurality of ML model variants from the plurality of derived ML models based on the attribution-based diversity metric.

Example 3 includes the subject matter of Example 2, and optionally, wherein the processor is configured to select a plurality of ML model candidates from the plurality of derived ML models, and to select the plurality of ML model variants from the plurality of ML model candidates based on the attribution-based diversity metric.

Example 4 includes the subject matter of Example 3, and optionally, wherein the processor is configured to select the plurality of ML model candidates from the plurality of derived ML models based on a performance criterion corresponding to performance of the plurality of derived ML models.

Example 5 includes the subject matter of any one of Examples 2-4, and optionally, wherein the processor is configured to determine a plurality of attribution-based diversity metric scores corresponding to a plurality of model groups, and to select the plurality of ML model variants from the plurality of derived ML models based on the plurality of attribution-based diversity metric scores.

Example 6 includes the subject matter of Example 5, and optionally, wherein the processor is configured to determine a plurality of performance scores corresponding to the plurality of model groups, and to select the plurality of ML model variants from the plurality of derived ML models based on the plurality of performance scores.

Example 7 includes the subject matter of any one of Examples 2-6, and optionally, wherein the processor is configured to select the plurality of ML model variants from the plurality of derived ML models based on a performance criterion corresponding to performance of the plurality of derived ML models.

Example 8 includes the subject matter of any one of Examples 2-7, and optionally, wherein the processor is configured to generate the plurality of derived ML models based on a Neural Architecture Search (NAS).

Example 9 includes the subject matter of any one of Examples 1-8, and optionally, wherein the processor is configured to generate the plurality of ML model variants based on the attribution-based diversity metric.

Example 10 includes the subject matter of any one of Examples 1-9, and optionally, wherein the processor is configured to determine the multi-model ML architecture based on the attribution-based diversity metric.

Example 11 includes the subject matter of any one of Examples 1-10, and optionally, wherein the processor is configured to select the multi-model ML architecture from a plurality of multi-model ML architectures based on computing resources of a computing device to execute one or more of the plurality of ML model variants.

Example 12 includes the subject matter of any one of Examples 1-11, and optionally, wherein the processor is configured to select the multi-model ML architecture from a plurality of multi-model ML architectures based on functional requirements of the multi-model ML architecture.

Example 13 includes the subject matter of any one of Examples 1-12, and optionally, wherein the processor is configured to select the multi-model ML architecture from a plurality of multi-model ML architectures based on a hazard criterion corresponding to one or more hazards, which have potential to degrade performance of the ML model.

Example 14 includes the subject matter of any one of Examples 1-13, and optionally, wherein the processor is configured to determine a first attribution-based diversity metric score corresponding to a first group of ML models and to determine a second attribution-based diversity metric score corresponding to a second group of ML models, wherein the first attribution-based diversity metric score is higher than the second attribution-based diversity metric score, and wherein a diversity between attribution schemes of ML models in the first group of ML models is greater than a diversity between attribution schemes of ML models in the second group of ML models.

Example 15 includes the subject matter of any one of Examples 1-14, and optionally, wherein the ML model comprises an image classification ML model to process image information of an image, and wherein the first attribution scheme represents a level of attribution of one or more pixels of the image to an output of the first ML model variant, and the second attribution scheme represents a level of attribution of one or more second pixels of the image to an output of the second ML model variant.

Example 16 includes the subject matter of any one of Examples 1-15, and optionally, wherein the ML model comprises an ML model to process the input information at an autonomous robot.

Example 17 includes the subject matter of any one of Examples 1-16, and optionally, wherein the processor is configured to determine the multi-model ML architecture comprising a first plurality of ML model variants to be executed on a first computing device, and a second plurality of ML model variants to be executed on a second computing device.

Example 18 includes the subject matter of Example 17, and optionally, wherein the processor is configured to determine the first plurality of ML model variants based on computing resources of the first computing device, and to determine the second plurality of ML model variants based on computing resources of the second computing device.

Example 19 includes the subject matter of Example 17 or 18, and optionally, wherein the processor is configured to execute the first plurality of ML model variants, and to provide the second plurality of ML model variants to the second computing device.

Example 20 includes the subject matter of Example 19, and optionally, wherein the one or more first ML model variants are configured to perform one or more first parts of a task, and the one or more second ML model variants are configured to perform one or more second parts of the task.

Example 21 includes the subject matter of Example 20, and optionally, wherein the one or more second parts of the task comprising fail-safe operations corresponding to one or more fail-safe events of the task.

Example 22 includes the subject matter of Example 20 or 21, and optionally, wherein the one or more second parts of the task comprise safety operations corresponding to one or more safety events.

Example 23 includes the subject matter of any one of Examples 17-22, and optionally, wherein the first computing device comprises a server, and the second computing device comprises an autonomous robot.

Example 24 comprises a computing device comprising the apparatus of any one of Examples 1-23.

Example 25 comprises an apparatus comprising means for executing any of the described operations of Examples 1-23.

Example 26 comprises a product comprising one or more tangible computer-readable non-transitory storage media comprising computer-executable instructions operable to, when executed by at least one processor, enable the at least one processor to cause a device to perform any of the described operations of Examples 1-23.

Example 27 comprises an apparatus comprising: a memory interface; and processing circuitry configured to: perform any of the described operations of Examples 1-23.

Example 28 comprises a method comprising any of the described operations of Examples 1-23.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    an input to receive Machine Learning (ML) model information corresponding to an ML model to process input information; and
    a processor configured to construct a multi-model ML architecture comprising a plurality of ML model variants based on the ML model, wherein the processor is configured to determine a plurality of derived ML models based on the ML model, and to select the plurality of ML model variants from the plurality of derived ML models based on an attribution-based diversity metric corresponding to a model group comprising a first ML model variant and a second ML model variant, wherein the attribution-based diversity metric corresponding to the model group is based on a diversity between a first attribution scheme and a second attribution scheme, the first attribution scheme representing one or more first portions of the input information attributing to an output of the first ML model variant, the second attribution scheme representing one or more second portions of the input information attributing to an output of the second ML model variant.

2. The apparatus of claim 1, wherein the processor is configured to select a plurality of ML model candidates from the plurality of derived ML models, and to select the plurality of ML model variants from the plurality of ML model candidates based on the attribution-based diversity metric.

3. The apparatus of claim 2, wherein the processor is configured to select the plurality of ML model candidates from the plurality of derived ML models based on a performance criterion corresponding to performance of the plurality of derived ML models.

4. The apparatus of claim 1, wherein the processor is configured to determine a plurality of attribution-based diversity metric scores corresponding to a plurality of model groups, and to select the plurality of ML model variants from the plurality of derived ML models based on the plurality of attribution-based diversity metric scores.

5. The apparatus of claim 4, wherein the processor is configured to determine a plurality of performance scores corresponding to the plurality of model groups, and to select the plurality of ML model variants from the plurality of derived ML models based on the plurality of performance scores.

6. The apparatus of claim 1, wherein the processor is configured to select the plurality of ML model variants from the plurality of derived ML models based on a performance criterion corresponding to performance of the plurality of derived ML models.

7. The apparatus of claim 1, wherein the processor is configured to generate the plurality of derived ML models based on a Neural Architecture Search (NAS).

8. The apparatus of claim 1, wherein the processor is configured to generate the plurality of ML model variants based on the attribution-based diversity metric.

9. The apparatus of claim 1, wherein the processor is configured to determine the multi-model ML architecture based on the attribution-based diversity metric.

10. The apparatus of claim 1, wherein the processor is configured to select the multi-model ML architecture from a plurality of multi-model ML architectures based on computing resources of a computing device to execute one or more of the plurality of ML model variants.

11. The apparatus of claim 1, wherein the processor is configured to determine a first attribution-based diversity metric score corresponding to a first group of ML models and to determine a second attribution-based diversity metric score corresponding to a second group of ML models, wherein the first attribution-based diversity metric score is higher than the second attribution-based diversity metric score, and wherein a diversity between attribution schemes of ML models in the first group of ML models is greater than a diversity between attribution schemes of ML models in the second group of ML models.

12. The apparatus of claim 1, wherein the ML model comprises an image classification ML model to process image information of an image, and wherein the first attribution scheme represents a level of attribution of one or more pixels of the image to an output of the first ML model variant, and the second attribution scheme represents a level of attribution of one or more second pixels of the image to an output of the second ML model variant.

13. The apparatus of claim 1, wherein the ML model comprises an ML model to process the input information at an autonomous robot.

14. The apparatus of claim 1, wherein the processor is configured to determine the multi-model ML architecture comprising a first plurality of ML model variants to be executed on a first computing device, and a second plurality of ML model variants to be executed on a second computing device.

15. The apparatus of claim 14, wherein the processor is configured to determine the first plurality of ML model variants based on computing resources of the first computing device, and to determine the second plurality of ML model variants based on computing resources of the second computing device.

16. The apparatus of claim 14, wherein the processor is configured to execute the first plurality of ML model variants, and to provide the second plurality of ML model variants to the second computing device.

17. The apparatus of claim 16, wherein the first plurality of ML model variants is configured to perform one or more first parts of a task, and the second plurality of ML model variants is configured to perform one or more second parts of the task.

18. The apparatus of claim 17, wherein the one or more second parts of the task comprise fail-safe operations corresponding to one or more fail-safe events of the task.

19. The apparatus of claim 17, wherein the one or more second parts of the task comprise safety operations corresponding to one or more safety events.

20. The apparatus of claim 14, wherein the first computing device comprises a server, and the second computing device comprises an autonomous robot.

21. A product comprising one or more tangible computer-readable non-transitory storage media comprising computer-executable instructions operable to, when executed by at least one processor, enable the at least one processor to cause a computing device to:

process Machine Learning (ML) model information corresponding to an ML model to process input information; and construct a multi-model ML architecture comprising a plurality of ML model variants based on the ML model by determining the plurality of ML model variants based on an attribution-based diversity metric corresponding to a model group comprising a first ML model variant and a second ML model variant, wherein the attribution-based diversity metric corresponding to the model group is based on a diversity between a first attribution scheme and a second attribution scheme, the first attribution scheme representing one or more first portions of the input information attributing to an output of the first ML model variant, the second attribution scheme representing one or more second portions of the input information attributing to an output of the second ML model variant, wherein the instructions, when executed, cause the computing device to determine a first attribution-based diversity metric score corresponding to a first group of ML models and to determine a second attribution-based diversity metric score corresponding to a second group of ML models, wherein the first attribution-based diversity metric score is higher than the second attribution-based diversity metric score, and wherein a diversity between attribution schemes of ML models in the first group of ML models is greater than a diversity between attribution schemes of ML models in the second group of ML models.

22. The product of claim 21, wherein the instructions, when executed, cause the computing device to determine a plurality of derived ML models based on the ML model, and to select the plurality of ML model variants from the plurality of derived ML models based on the attribution-based diversity metric.

23. An apparatus comprising:

means for inputting Machine Learning (ML) model information corresponding to an ML model to process input information; and means for constructing a multi-model ML architecture comprising a plurality of ML model variants based on the ML model by determining the plurality of ML model variants based on an attribution-based diversity metric corresponding to a model group comprising a first ML model variant and a second ML model variant, wherein the attribution-based diversity metric corresponding to the model group is based on a diversity between a first attribution scheme and a second attribution scheme, the first attribution scheme representing one or more first portions of the input information attributing to an output of the first ML model variant, the second attribution scheme representing one or more second portions of the input information attributing to an output of the second ML model variant, wherein the means for constructing the multi-model ML architecture comprises means for determining the multi-model ML architecture comprising a first plurality of ML model variants to be executed on a first computing device, and a second plurality of ML model variants to be executed on a second computing device.

24. The apparatus of claim 23 comprising means for determining a first attribution-based diversity metric score corresponding to a first group of ML models, and determining a second attribution-based diversity metric score corresponding to a second group of ML models, wherein the first attribution-based diversity metric score is higher than the second attribution-based diversity metric score, and wherein a diversity between attribution schemes of ML models in the first group of ML models is greater than a diversity between attribution schemes of ML models in the second group of ML models.

* * * * *